US012596641B2

(12) United States Patent
Rychlik et al.

(10) Patent No.: US 12,596,641 B2
(45) Date of Patent: Apr. 7, 2026

(54) HARDWARE AND SOFTWARE HYBRID CONFIGURATION OF DRAM CHANNEL INTERLEAVING MANAGEMENT

(71) Applicant: QUALCOMM Incorporated, San Diego, CA (US)

(72) Inventors: Bohuslav Rychlik, San Diego, CA (US); Sebastian Ahmed, San Diego, CA (US); Christophe Avoinne, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/426,156

(22) Filed: Jan. 29, 2024

(65) Prior Publication Data

US 2025/0245141 A1 Jul. 31, 2025

(51) Int. Cl.
*G06F 12/02* (2006.01)
(52) U.S. Cl.
CPC ............................... *G06F 12/0223* (2013.01)
(58) Field of Classification Search
None
See application file for complete search history.

(56) References Cited

U.S. PATENT DOCUMENTS 11,580,025 B1 * 2/2023 Nakra ................. G06F 12/0811
2005/0060482 A1 3/2005 Ishikawa
2005/0246508 A1 11/2005 Shaw
2010/0332775 A1 12/2010 Kapil et al.
(Continued)

FOREIGN PATENT DOCUMENTS

WO WO-2022232008 A1 11/2022

OTHER PUBLICATIONS

International Search Report and Written Opinion—PCT/US2024/058968—ISA/EPO—Feb. 11, 2025.
(Continued)

*Primary Examiner* — Jared I Rutz
*Assistant Examiner* — Alexander J Yoon
(74) *Attorney, Agent, or Firm* — Muncy, Geissler, Olds & Lowe, P.C.

(57) ABSTRACT

Various embodiments include a memory controller and methods for implementing functions of the memory controller for hardware and software hybrid configuration of memory channel interleaving management. Embodiments may include a memory controller having a signaling mechanism configured to provide a configuration signal for indicating to the memory controller a layer of a memory channel interleaving hierarchy for software memory channel interleaving management, a processor configured to read the configuration signal and select the layer of the memory channel interleaving hierarchy for software memory channel interleaving management based on the configuration signal, and an integrated circuit configured to implement memory channel interleaving according to a layer of the memory channel interleaving hierarchy for hardware memory channel interleaving management. In some embodiments, the layers for software or hardware memory channel interleaving management may include any of an intra-memory channel group, an inter-memory channel group, or an inter-die memory channel group layer.

17 Claims, 19 Drawing Sheets

(56) References Cited

U.S. PATENT DOCUMENTS

| | | | |
|---|---|---|---|
| 2013/0007378 A1 | 1/2013 | Mamidala et al. | |
| 2014/0164690 A1* | 6/2014 | De | G06F 12/0607 |
| | | | 711/105 |
| 2017/0140800 A1 | 5/2017 | Wingard et al. | |
| 2017/0162235 A1 | 6/2017 | De et al. | |
| 2017/0262404 A1* | 9/2017 | Liang | G06F 13/16 |
| 2017/0336973 A1* | 11/2017 | Chakraborty | G06F 12/0607 |
| 2019/0004800 A1 | 1/2019 | Ong et al. | |
| 2019/0042408 A1* | 2/2019 | Schmisseur | G06F 15/161 |
| 2022/0254409 A1* | 8/2022 | Desai | G11C 11/40618 |
| 2022/0276795 A1 | 9/2022 | Islam et al. | |
| 2023/0195620 A1* | 6/2023 | Jordan | G06F 12/0292 |
| | | | 711/154 |

OTHER PUBLICATIONS

Tovletoglou K., et al., "HaRMony: Heterogeneous-Reliability Memory and QoS-Aware Energy Management on Virtualized Servers", Proceedings of the Twenty-fifth International Conference on Architectural Support for Programming Languages and Operating Systems, ACM, New York, USA, Mar. 9, 2020, pp. 575-590, XP058460476, sections 2,3.

* cited by examiner

500a

500b

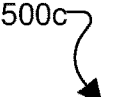
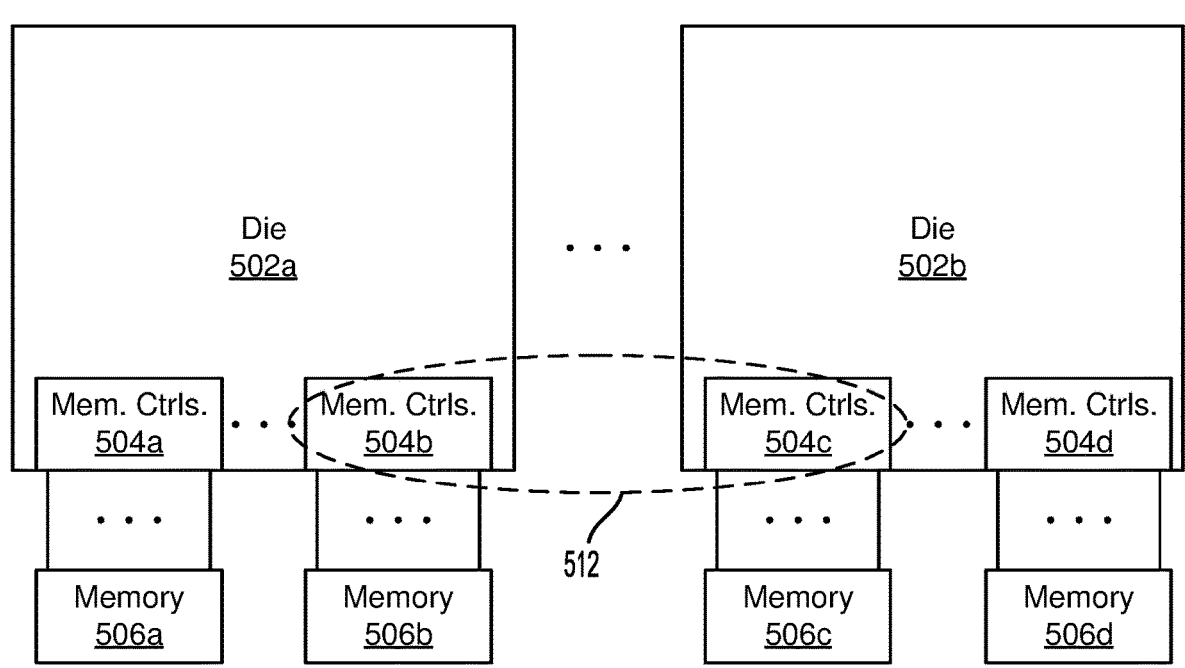
FIG. 5C

600a

Undifferentiated Memory
602

DieN 604b

.
.
.

Die0 604a

DieN.ChanGrpQ <u>606d</u>

.
.
.

DieN.ChanGrp0 <u>606c</u>

.
.
.

Die0.ChanGrpP <u>606b</u>

.
.
.

Die0.ChanGrp0 <u>606a</u>

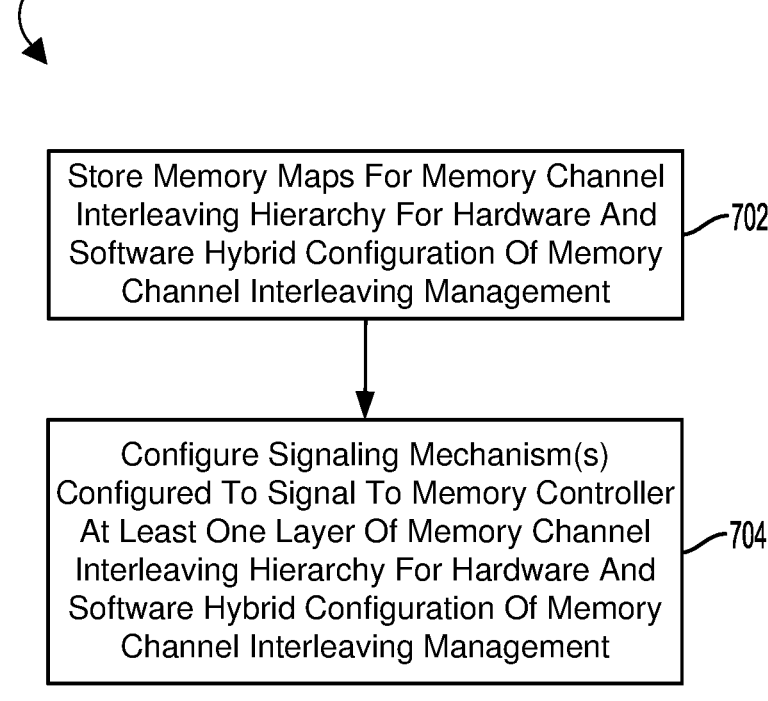

Store Memory Maps For Memory Channel Interleaving Hierarchy For Hardware And Software Hybrid Configuration Of Memory Channel Interleaving Management ⌐702

Configure Signaling Mechanism(s) Configured To Signal To Memory Controller At Least One Layer Of Memory Channel Interleaving Hierarchy For Hardware And Software Hybrid Configuration Of Memory Channel Interleaving Management ⌐704

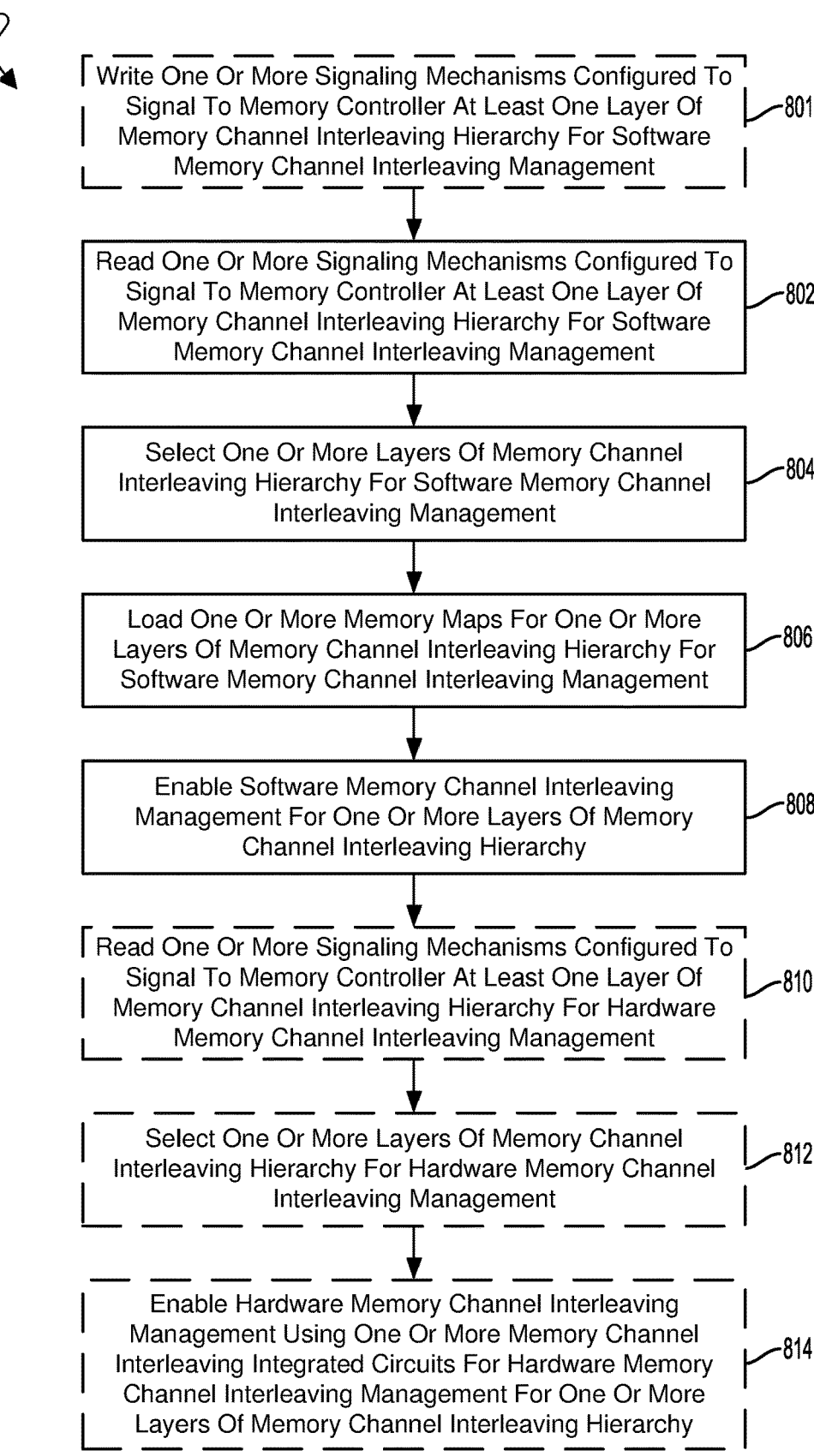

Write One Or More Signaling Mechanisms Configured To Signal To Memory Controller At Least One Layer Of Memory Channel Interleaving Hierarchy For Software Memory Channel Interleaving Management ⟋801

Read One Or More Signaling Mechanisms Configured To Signal To Memory Controller At Least One Layer Of Memory Channel Interleaving Hierarchy For Software Memory Channel Interleaving Management ⟋802

Select One Or More Layers Of Memory Channel Interleaving Hierarchy For Software Memory Channel Interleaving Management ⟋804

Load One Or More Memory Maps For One Or More Layers Of Memory Channel Interleaving Hierarchy For Software Memory Channel Interleaving Management ⟋806

Enable Software Memory Channel Interleaving Management For One Or More Layers Of Memory Channel Interleaving Hierarchy ⟋808

Read One Or More Signaling Mechanisms Configured To Signal To Memory Controller At Least One Layer Of Memory Channel Interleaving Hierarchy For Hardware Memory Channel Interleaving Management ⟋810

Select One Or More Layers Of Memory Channel Interleaving Hierarchy For Hardware Memory Channel Interleaving Management ⟋812

Enable Hardware Memory Channel Interleaving Management Using One Or More Memory Channel Interleaving Integrated Circuits For Hardware Memory Channel Interleaving Management For One Or More Layers Of Memory Channel Interleaving Hierarchy ⟋814

Die1
1002b

Die1.GPU Page 2 1006f

Die1.GPU Page 1 1006e

Die1.GPU Page 0 1006d

Non-GPU Page 3 1004d

Non-GPU Page 1 1004c

Memory
Channel
Groups 1
1008b

Die0
1002a

Die0.GPU Page 2 1006c

Die0.GPU Page 1 1006b

Die0.GPU Page 0 1006a

Non-GPU Page 2 1004c

Non-GPU Page 0 1004a

Memory
Channel
Groups 0
1008a

1100

Memory Channel Group 5 1108f

Other Page 5 1106f

Die1 1102b

Memory Channel Group 4 1108e

Other Page 3 1106d

Memory Channel Group 3 1108d

Other Page 1 1106b

Memory Channel Group 2 1108c

Other Page 4 1106e

Die0 1102a

Memory Channel Group 1 1108b

Other Page 2 1106c

Other Page 6 1106g

Other Page 0 1106a

Die0.SafetySub Page 2 1104c

Die0.SafetySub Page 1 1104b

Die0.SafetySub Page 0 1104a

Memory Channel Group 0 1108a

1500

1500

HARDWARE AND SOFTWARE HYBRID CONFIGURATION OF DRAM CHANNEL INTERLEAVING MANAGEMENT

BACKGROUND

Some memory systems employ a high number of dynamic random-access memory (DRAM) channel counts. A DRAM channel constitutes a discrete connection between a memory controller and DRAM. Each DRAM channel handles the address, data, and signal control messages. Modern processors utilize multi-channel DRAMs to exploit memory parallelism. Memory parallelism can be achieved by DRAM channel interleaving in which short sequences of DRAM physical addresses are organized across the DRAM channels. DRAM channel interleaving is used to improve DRAM access performance, which may enhance the overall speed and efficiency of DRAM operations.

SUMMARY

Various aspects provide methods and apparatuses for implementing such methods for implementing hardware and software hybrid configuration of memory channel interleaving management. Aspects may include a memory subsystem for a computing device, that may include at least one memory controller that may include at least one signaling mechanism configured to provide at least one configuration signal for indicating to the memory controller at least one layer of a memory channel interleaving hierarchy for software memory channel interleaving management, at least one processor configured to read the at least one configuration signal, and select the at least one layer of the memory channel interleaving hierarchy for software memory channel interleaving management based on the at least one configuration signal; and at least one integrated circuit configured to implement memory channel interleaving according to at least one layer of the memory channel interleaving hierarchy for hardware memory channel interleaving management concurrently with software memory channel interleaving management by the at least one processor.

In some aspects, the at least one layer of the memory channel interleaving hierarchy for software memory channel interleaving management may include at least one of an intra-memory channel group layer, an inter-memory channel group layer, or an inter-die memory channel group layer, and the at least one layer of the memory channel interleaving hierarchy for hardware memory channel interleaving management may include at least one of the intra-memory channel group layer, the inter-memory channel group layer, or the inter-die memory channel group layer that is different from the at least one layer of the memory channel interleaving hierarchy for software memory channel interleaving management.

In some aspects, the at least one processor may be further configured to load at least one memory map corresponding to the at least one layer of the memory channel interleaving hierarchy for software memory channel interleaving management.

In some aspects, the at least one processor may be further configured to implement memory channel interleaving according to the at least one layer of the memory channel interleaving hierarchy for software memory channel interleaving management.

In some aspects, the at least one processor may be further configured to implement the memory channel interleaving across a plurality of memory channels of at least one memory channel group of the at least one layer of the memory channel interleaving hierarchy for software memory channel interleaving management, and the at least one integrated circuit may be further configured to implement the memory channel interleaving across a plurality of memory channels of at least one memory channel group of the at least one layer of the memory channel interleaving hierarchy for hardware memory channel interleaving management.

In some aspects, the at least one configuration signal may be further configured to indicate to the memory controller the at least one layer of the memory channel interleaving hierarchy for hardware memory channel interleaving management, and the at least one processor may be further configured to select the at least one integrated circuit configured to implement memory channel interleaving according to the at least one layer of the memory channel interleaving hierarchy for hardware memory channel interleaving management based on the at least one configuration signal.

In some aspects, the least one signaling mechanism may include at least one of a register, an electronic fuse, or a pin.

Further aspects include a computing device including a memory and a processor and/or memory frequency device configured to perform operations of any of the methods summarized above. Further aspects include a non-transitory processor-readable storage medium having stored thereon processor-executable software instructions configured to cause a processor and/or memory frequency device to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIGS. 5A-5C are component block diagrams illustrating examples of layers of a memory channel interleaving hierarchy of a memory subsystem of the computing device suitable for implementing various embodiments.

FIGS. 6A-6C are component block diagrams illustrating examples of memory map views of layers of a memory channel interleaving hierarchy of a memory subsystem of the computing device suitable for implementing various embodiments.

FIG. 7 is a process flow diagram illustrating an example method for configuring a memory subsystem for implementing hardware and software hybrid configuration of DRAM channel interleaving management according to an embodiment.

FIG. 8 is a process flow diagram illustrating an example method for configuring a memory subsystem for implementing hardware and software hybrid configuration of DRAM channel interleaving management according to an embodiment.

DETAILED DESCRIPTION

Figure 1:
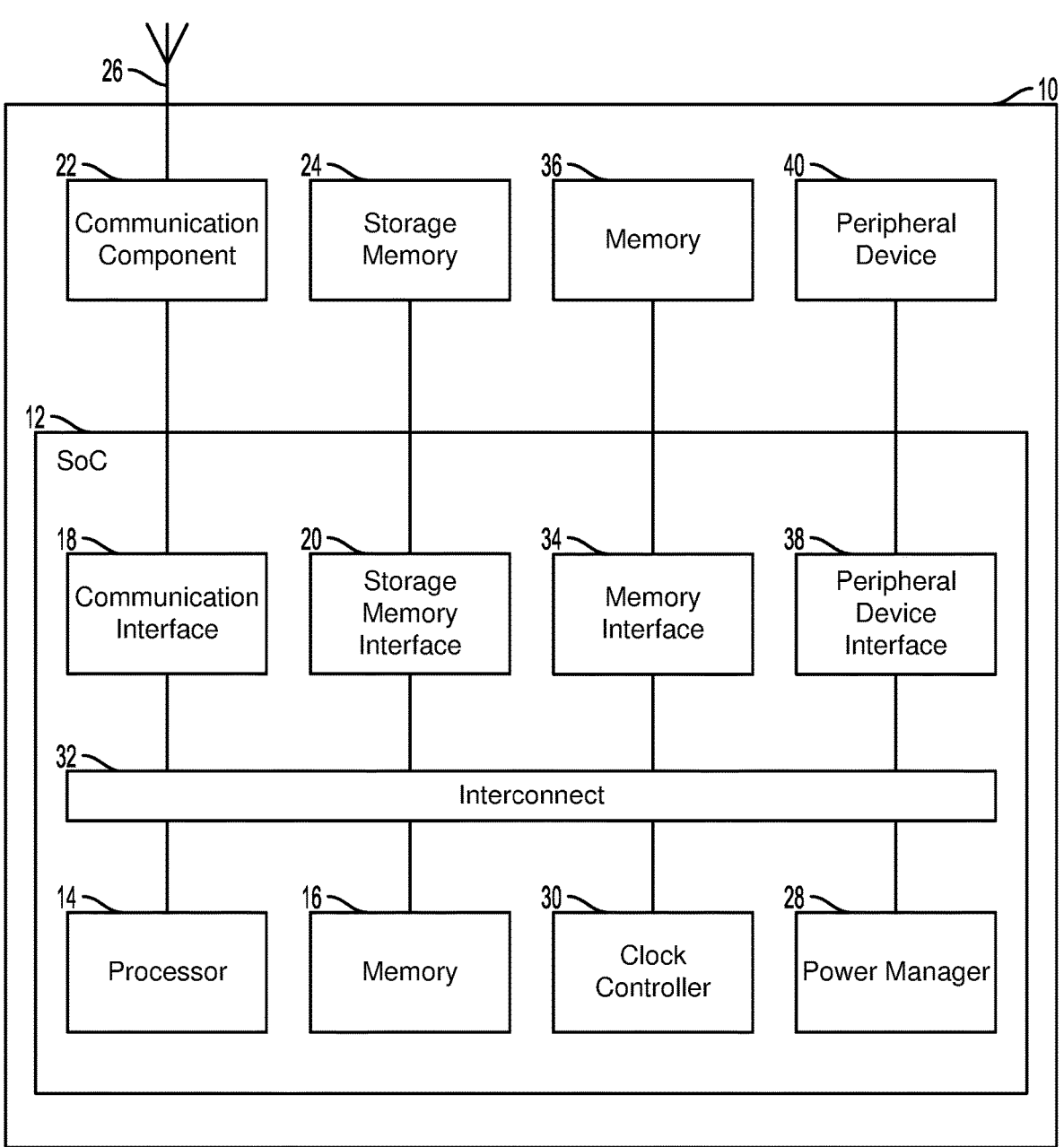
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices implementing such methods of configuring a memory subsystem for implementing hardware and software hybrid configuration of memory channel interleaving management. Embodiments may include a memory controller having a signaling mechanism configured to provide a configuration signal configured for indicating to the memory controller a layer of a memory channel interleaving hierarchy for software memory channel interleaving management. A processor system of the memory controller may be configured to read the configuration signal and select the layer of the memory channel interleaving hierarchy for software memory channel interleaving management based on the configuration signal. An integrated circuit of the memory controller may be configured to implement memory channel interleaving according to a layer of the memory channel interleaving hierarchy for hardware memory channel interleaving management. In some embodiments, the layers of the memory channel interleaving hierarchy for software or hardware memory channel interleaving management may include any of an intra-memory channel group layer, an inter-memory channel group layer, or an inter-die memory channel group layer.

The term "computing device" is used herein to refer to stationary computing devices including personal computers, desktop computers, all-in-one computers, workstations, super computers, mainframe computers, embedded computers (such as in vehicles and other larger systems), computing systems within or configured for use in vehicles, servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

The term "memory map" is used herein to refer to a structured representation of memory address spaces as allocated to various memory segments and computing device components, such as systems on chip (SoCs or dies). A memory map may serve as a schematic guide delineating the allocation and organization of memory resources within a computing system. A memory map may be in the form of a table or a diagram that identifies the correspondence between memory addresses and physical or virtual memory locations. In a computing system with memory distributed across multiple chips or dies, a memory map may include additional layers of mapping and address translation to bridge the physical separations in the memory system. Separate memories may include memory controllers and may be represented in a memory map as separate memory channels and/or memory channel groups. The term "memory channel group" is used herein to refer to a physical and logical association of two or more separate memory channels of a die identified for allocating memory address space to various processing resources or executing processes. Various embodiments enable data to be interleaved over memory channel groups of separate memory channels.

Various embodiments are described in terms of code, e.g., processor-executable instructions, for ease and clarity of explanation, but may be similarly applicable to any data, e.g., code, program data, or other information stored in memory. The terms "code," "data," and "information" are used interchangeably herein and are not intended to limit the scope of the claims and descriptions to the types of code, data, or information used as examples in describing various embodiments.

Some memory systems employ a high number of DRAM channel counts. A DRAM channel constitutes a discrete connection between a memory controller and DRAM. Each DRAM channel handles the address, data, and signal control messages. Modern processors utilize multi-channel DRAMs to exploit memory parallelism. Memory parallelism can be achieved by DRAM channel interleaving in which short sequences of DRAM physical addresses are organized across the DRAM channels. DRAM channel interleaving is used to improve DRAM access performance, to enhance the overall speed and efficiency of DRAM operations.

There are two independent DRAM channel interleaving strategies-hardware based, and software based. Hardware DRAM channel interleaving: enables interleaving across all DRAM channels of a memory subsystem with small granularity (e.g., a cache line or bus transaction (e.g., 64-256B)); does not have implementation requirements of software DRAM channel interleaving; typically can meet short-term channel bandwidth requirements for memory transactions; and is not flexible for optimization for different applications, such as localizing access. Software DRAM channel interleaving enables use of memory allocation schemes, such as Linux NUMA; has a granularity of an operating system page (e.g., 4-64 KB); is flexible for optimization for different applications; and the granularity can limit short-term channel bandwidth spreading.

Each of the two independent DRAM channel interleaving strategies has its own specific requirement for use of memory subsystem resources, such as power, and limit for memory subsystem performance, such as speed. Further, hardware DRAM channel interleaving cannot be tailored for different use cases, such as localizing accesses. Software DRAM channel interleaving can only be tailored for use cases to the extent limited by the use of software and operating system page granularity can limit short-term DRAM channel bandwidth spreading.

Embodiments of hardware and software hybrid configuration of DRAM channel interleaving management overcome the foregoing problems with the implementations of two independent DRAM channel interleaving strategies by enabling use of hardware DRAM channel interleaving and software DRAM channel interleaving concurrently. In other words, embodiments enable a flexible, hybrid hardware and software DRAM channel interleaving approach allowing arbitrary use of hardware and/or software DRAM channel interleaving management across various layers of a DRAM channel interleaving hierarchy.

There may be a number of possible physical and logical groupings for DRAM channels which participate in physical memory. The smallest grouping may be a grouping of DRAM channels called a DRAM channel group. A DRAM channel group may include two or more DRAM channels (e.g., 2, 4, 8, 16, 32, 64, etc. channels). There may be multiple DRAM channel groups of a die with each DRAM channel group occupying a specific physical position on the die. Multi-die architectures may employ DRAM channel groups of multiple dies.

DRAM channel groups may be organized for hardware and/or software DRAM channel interleaving management as various layers of a DRAM channel interleaving hierarchy. The layers of the DRAM channel interleaving hierarchy may represent different groupings of DRAM channel groups across which data may be interleaved. The DRAM channel interleaving hierarchy may be an organization of the layers according to an ordering system, such as based on degree of granularity of DRAM channel interleaving. For example, three such layers may include an intra-DRAM channel group layer, an inter-DRAM channel group layer, or an inter-die DRAM channel group layer. DRAM channel interleaving at the intra-DRAM channel group layer may include DRAM channel interleaving management implemented across DRAM channels of a single DRAM channel group. DRAM channel interleaving at the inter-DRAM channel group layer may include DRAM channel interleaving management implemented across DRAM channels of at least two DRAM channel groups of a single die. DRAM channel interleaving at the inter-die DRAM channel group layer may include DRAM channel interleaving management implemented across DRAM channels of at least two DRAM channel groups of at least two die.

Embodiments configure the memory subsystem to enable DRAM channel interleaving management at the various layers of the DRAM channel interleaving hierarchy such that each of the layers may be used for implementing at one of hardware DRAM channel interleaving management and software DRAM channel interleaving management. In the example of a 3 layer DRAM channel interleaving hierarchy, 2 of the layers may be used for implementing hardware DRAM channel interleaving management and one layer may be used for implementing software DRAM channel interleaving management, or vice versa. In some embodiments, the memory subsystem may be configured to enable DRAM channel interleaving management at the various layers of the DRAM channel interleaving hierarchy such that all of the layers may be used for implementing one of hardware DRAM channel interleaving management or software DRAM channel interleaving management.

A signaling mechanism may be implemented to signal to a memory controller of the memory subsystem how to configure the memory subsystem for hardware and software hybrid configuration of DRAM channel interleaving management. The signaling mechanism may include various implementations, such as any combination of registers, electronic fuses (or eFuse), and/or pins, from which the memory controller may read a configuration signal provided at the signaling mechanism. The configuration signal may be configured to indicate to the memory controller to implement software DRAM channel interleaving management for a specified layer of the DRAM channel interleaving hierarchy. In some embodiments, the configuration signal may be configured to indicate to the memory controller to implement hardware DRAM channel interleaving management for a specified layer of the DRAM channel interleaving hierarchy. The signaling mechanism may enable the memory subsystem to be configured for a given device or application by setting the signaling mechanism to inform the memory controller how hardware and software hybrid configuration of DRAM channel interleaving management will be handled at different layers of the DRAM channel interleaving hierarchy.

Various memory maps for different layers of the DRAM channel interleaving hierarchy may be configured to present views of the DRAM to the memory controller to enable the controller to implement hardware and software hybrid configuration of DRAM channel interleaving management. The memory maps may be configured to present the DRAM in a way that reflects regions in which software DRAM channel interleaving management may be implemented. Hardware DRAM channel interleaving management may be undifferentiated. However, for both hardware and software DRAM channel interleaving management, the memory maps may differentiate the DRAM channel groups for which software DRAM channel interleaving management applies.

To select hardware DRAM channel interleaving management or software DRAM channel interleaving management for the various layers of the DRAM channel interleaving hierarchy, a developer may choose a combination that may provide best performance and efficiency for a given application. The developer may configure the memory subsystem to implement the combination of hardware DRAM channel interleaving management or software DRAM channel interleaving management for the various layers of the DRAM channel interleaving hierarchy by setting the signaling mechanism. The settings of the signaling mechanism may inform the memory controller at boot of the memory map to use so the memory controller knows where data will be stored and the layers of the DRAM channel interleaving hierarchy for software DRAM channel interleaving management.

Embodiments and examples herein described with reference to DRAM, to specific numbers of layers of the DRAM channel interleaving hierarchy, to specific numbers of DRAM channel groups per layer or per die, to specific numbers of die, and to specific numbers of DRAM channels per DRAM channel group are used for ease of explanation and clarity and are not meant to be limiting. Descriptions referencing "DRAM" and/or "memory" may be similarly applicable to any type of random access memory (RAM) or main memory, or cache memory. Descriptions referencing specific numbers of layers of the DRAM channel interleaving hierarchy, of DRAM channel groups per inter-DRAM channel group layer and inter-die DRAM channel group layer, and of DRAM channels per DRAM channel group may be similarly applicable for any number 2 or greater. Descriptions referencing specific numbers of DRAM channel groups per intra-DRAM channel group layer or per die, or of die may be similarly applicable for any number 1 or greater.

FIG. 1 illustrates a system including a computing device 10 suitable for use with various embodiments. With reference to FIG. 1, the computing device 10 may include a system-on-chip (SoC) 12 with a processor 14, a memory 16, a communication interface 18, a storage memory interface 20, a memory interface 34, a power manager 28, a clock controller 30, a peripheral device interface 38, and an interconnect 32. The computing device 10 may further include a communication component 22, such as a wired or wireless modem, a storage memory 24, an antenna 26 for establishing a wireless communication link, a memory 36, and a peripheral device 40. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16, 36 for the SoC 12 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM) and/or dynamic RAM (DRAM), or cache memory. These memories 16, 36 may be configured to temporarily hold a limited amount of data received from a data sensor or subsystem, data and/or processor-executable code instructions that are requested from a non-volatile memory 16, 24, loaded to the memories 16, 36 from the non-volatile memory 16, 24 in anticipation of future access based on a variety of factors, and/or intermediary processing data and/or processor-executable code instructions produced by the processor 14 and temporarily stored for future quick access without being stored in non-volatile memory 16, 24. The memory 16, 36 may include multiple physical memory components, such as memory chips, that may be logically combined and/or separated to form the memory 16, 36. The memory interface 34 and the memory 36 may work in unison to allow the computing device 10 to load and retrieve data and processor-executable code on the memory 36.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory 24 may include multiple physical memory components, such as storage memory drives, chips, discs, etc., that may be logically combined and/or separated to form the storage memory 24. The storage memory interface 20 may control access to the storage memory 24 and allow the processor 14 to read data from and write data to the storage memory 24.

The power manager 28 may be configured to control power states of one or more power rails (not shown) for power delivery to the components of the SoC 12. In some embodiments, the power manager 28 may be configured to control amounts of power provided to the components of the SoC 12. For example, the power manager 28 may be configured to control connections between components of the SoC 12 and the power rails. As another example, the power manager 28 may be configured to control amounts of power on the power rails connected to the components of the SoC 12. The power manager 28 may be configured as a power management integrated circuit (power management ICs or PMIC).

A clock controller 30 may be configured to control clock signals transmitted to the components of the SoC 12. For example, the clock controller 30 may gate a component of the SoC 12 by disconnecting the component of the SoC 12 from a clock signal and may ungate the component of the SoC 12 by connecting the component of the SoC 12 to the clock signal.

A peripheral device interface 38 may enable components of the SoC 12, such as the processor 14 and/or the memory 16, to communicate with a peripheral device 40. The peripheral device interface 38 may provide and manage physical and logical connections between the components of the SoC 12 and the peripheral device 40. The peripheral device interface 38 may also manage communication between the components of the SoC 12 and the peripheral device 40, such as by directing and/or allowing communications between transmitter and receiver pairs of the components of the SoC 12 and the peripheral device 40 for a communication. The communications may include transmission of memory access commands, addresses, data, interrupt signals, state signals, etc. A peripheral device 40 may be any component of the computing device 10 separate from the SoC 12, such as a processor, a memory, a subsystem, etc. In some embodiments, the peripheral device interface 38 may include a PCIe root complex and may enable PCIe protocol communication between the components of the SoC 12 and the peripheral device 40.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Some or all of the components, including components of the SoC 12, connected to the SoC 12, and the SoC 12, of the computing device 10 may be arranged differently, separated, and/or combined while still serving the functions of the various embodiments. The computing device 10 may not be limited to one of each of the components, and multiple instances of each component may be included in various configurations of the computing device.

Figure 2:
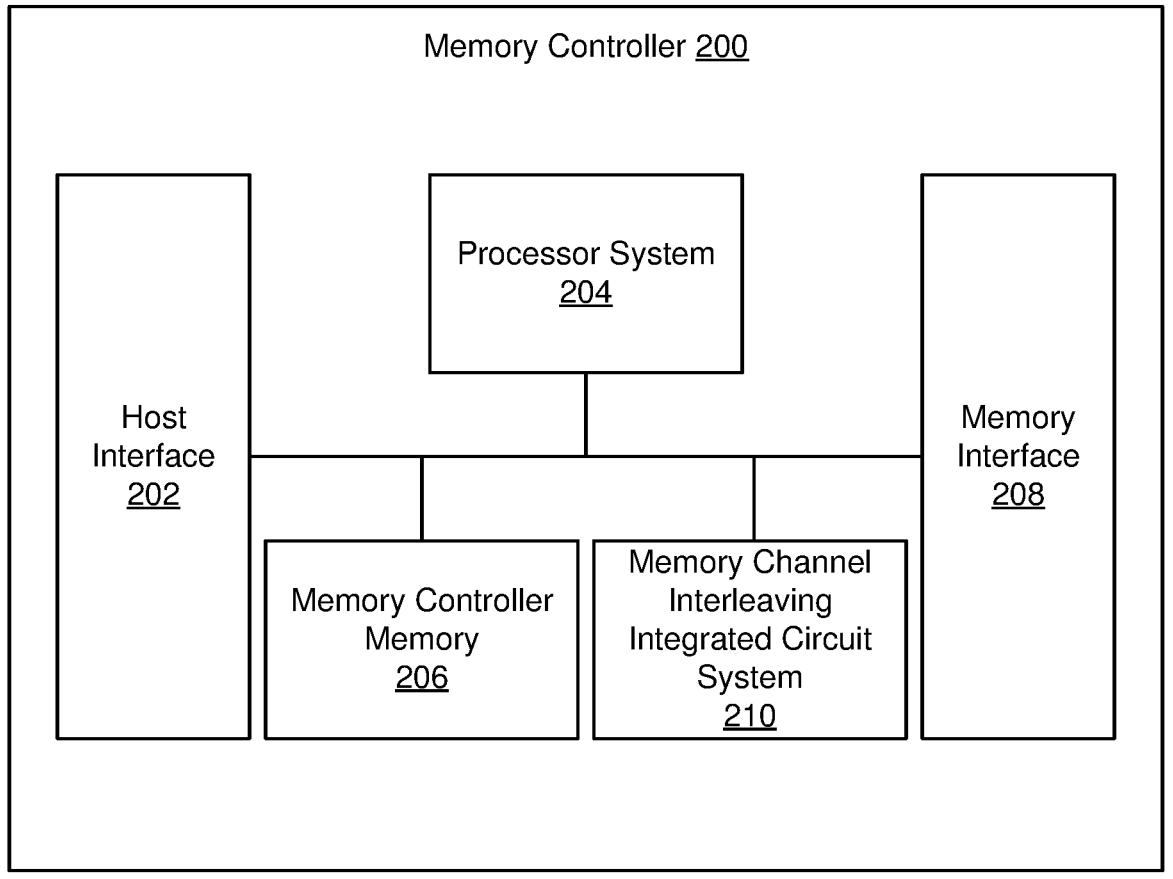
FIG. 2 is a component block diagram illustrating an example memory controller of the computing device suitable for implementing various embodiments.

FIG. 2 illustrates an example memory controller 200 (e.g., memory interface 34 in FIG. 1) of the computing device (e.g., computing device 10 in FIG. 1) suitable for implementing various embodiments. With reference to FIGS. 1 and 2, the memory controller 200 may include components configured for enabling interaction between a memory (e.g., memory 36 in FIG. 1) and components of the computing device (e.g., SoC 12, processor 14, peripheral device 40 in FIG. 1) for reading from and writing to the memory. The memory may be configured as a random access memory (RAM) or main memory, such as a DRAM, SRAM, etc., and/or cache memory. The memory controller 200 may be a standalone component of and/or connected to the SoC (e.g., SoC 12 in FIG. 1) and/or an integrated component of the processor (e.g., processor 14 in FIG. 1) and/or the memory.

The memory controller 200 may provide and manage physical and logical connections between the components of the computing device and the memory and manage command and data transactions between the components of the computing device and the memory. The memory controller 200 may include a host interface 202 and a memory interface 208. The host interface 202 may provide and manage physical and logical connections between the components of the computing device and the memory controller 200. The memory interface 208 may provide and manage physical and logical connections between the memory and the memory controller 200. Physical connections may include physical components via which electrical signals are transmitted and received between the components of the computing device and the memory, such as hardware, pins, leads, wires, buses, semiconductors, processors, transistors, capacitors, resistors, integrated circuits, etc. Logical connections may include hardware, software, and/or firmware executed for creating, implementing, managing, controlling, etc. the physical connections and/or transmission and/or receipt of electrical signals via the physical connections between the components of the computing device and the memory.

A connection between the memory controller 200 and the memory, managed by the memory interface 208, may be referred to as a memory channel, or channel, which may be a discrete connection between the memory controller 200 and the memory and/or a portion of the memory, as described further herein. The memory controller 200 may be configured to manage command and data transactions between the components of the computing device and the memory via the memory channels of the memory controller 200. A technique implemented by the memory controller 200 for managing the command and data transactions may include memory channel interleaving. The memory controller 200 may use multiple memory channels to the memory to interleave, or distribute, execution of the commands and/or data transactions, including reading from and/or writing to the memory, across the multiple memory channels. Memory channel interleaving may enable access to and/or storage of data at interleaved, or distributed, locations of the memory.

Memory channel interleaving management, for implementing memory channel interleaving, may be implemented in software and/or hardware. Software memory channel interleaving management may be implemented by software executed by a processor system 204 (e.g., processor 14 in FIG. 1), including one or more processors (e.g., processor 14 in FIG. 1), of the memory controller 200. Hardware memory channel interleaving management may be implemented by a memory channel interleaving integrated circuit system 210, including one or more integrated circuits of the memory controller 200. The memory channel interleaving integrated circuit system 210 may be a standalone component of the of the memory controller 200 and/or integrated into another component of the of the memory controller 200, such as the processor system 204 and/or the memory interface 208.

The software and/or the memory channel interleaving integrated circuit system 210 may be configured to implement memory channel interleaving management for any combination of memory channels, including memory channel groups of 2 or more memory channels. Each memory channel group may include 2 or more memory channels of a die (e.g., SoC 12 in FIG. 1) of the computing device. In some embodiments, the software and/or the memory channel interleaving integrated circuit system 210 may be configured to implement memory channel interleaving management for various layers of a memory channel interleaving hierarchy. The layers of the memory channel interleaving hierarchy may represent different groupings of memory channel groups across which data may be interleaved. The memory channel interleaving hierarchy may be an organization of the layers according to an ordering system, such as based on degree of granularity of memory channel interleaving. For example, three such layers may include an intra-memory channel group layer, an inter-memory channel group layer, or an inter-die memory channel group layer. Memory channel interleaving management at the intra-memory channel group layer may include memory channel interleaving management implemented across memory channels of a single memory channel group. Memory channel interleaving management at the inter-memory channel group layer may include memory channel interleaving management implemented across memory channels of at least two memory channel groups of a single die. Memory channel interleaving management at the inter-die memory channel group layer may include memory channel interleaving management implemented across memory channels of at least two memory channel groups of at least two die. In some embodiments, the memory channel interleaving integrated circuit system 210 may include multiple integrated circuits, each configured to implement memory channel interleaving management for a different layer of the memory channel interleaving hierarchy.

The processor system 204 may also be configured with software for the execution of hardware and software hybrid configuration of memory channel interleaving management, referred to herein as hybrid configuration software. In some embodiments, the hybrid configuration software may be stored at a storage memory (e.g., storage memory 24 in FIG. 1) of the computing device and loaded to a memory controller memory 206, such as a cache memory, for execution by the processor system 204. In some embodiments, the hybrid configuration software may be stored at the memory controller memory 206, such as a read only memory, and executed from or loaded to another portion of the memory controller memory 206, such as a cache memory, for execution by the processor system 204. The hybrid configuration software may be configured to cause the processor system 204 to select and/or enable implementation of memory channel interleaving management by the processor system 204 executing software and/or the memory channel interleaving integrated circuit system 210 for the layer of the memory channel interleaving hierarchy.

The hybrid configuration software may configure the processor system 204 to read a configuration signal configured to indicate to the processor system 204 for which layer of the memory channel interleaving hierarchy to implement software memory channel interleaving management. The signaling mechanism may be part of the memory controller memory 206, such as a register and/or eFuse, and/or a pin (not shown) of the memory controller 200, such as part of the host interface 202, connected to a host device (e.g., SoC 12, processor 14, peripheral device 40 in FIG. 1). The configuration signal may be a value set at the signaling mechanism configured to indicate to the processor system 204 for which layer of the memory channel interleaving hierarchy to implement software memory channel interleaving management. In some embodiments, the configuration signal may be a value set at the signaling mechanism configured to indicate to the processor system 204 for which layer of the memory channel interleaving hierarchy to use software and/or hardware memory channel interleaving management.

In some embodiments, the configuration signal may be preset at the signaling mechanism, such as by a manufacturer of the computing device or a component of the computing device, including the memory controller 200, or by a software developer. In some embodiments, the configuration signal may be set at the signaling mechanism at runtime. The hybrid configuration software may configure the processor system 204 to write the configuration signal at the signaling mechanism. One or more criteria may be evaluated for setting the configuration signal to a specific value. In some embodiments, a software image loaded during a boot stage of the host device may be associated with a layer of the memory channel interleaving hierarchy for which to implement software memory channel interleaving management and may prompt setting the configuration signal accordingly. In some embodiments, a mode of operation (of the host device (e.g., based on available power, security setting, performance setting, etc.) may be associated with a layer of the memory channel interleaving hierarchy used to implement software memory channel interleaving management and may prompt setting the configuration signal accordingly. In some embodiments, an application executed by the computing device may be configured to issue a command to the processor system 204 to set the configuration signal. The command may include a request to set the configuration signal to indicate a layer of the memory channel interleaving hierarchy used to implement software memory channel interleaving management. In some embodiments, the configuration signal may be written to the signaling mechanism overwriting a preset configuration signal and/or to another signaling mechanism taking precedence over the preset configuration signal.

The hybrid configuration software may configure the processor system 204 to interpret the configuration signal, and to select and/or enable software memory channel interleaving management for any of the layers of the memory channel interleaving hierarchy indicated by the configuration signal. In some embodiments, hardware memory channel interleaving management may be enabled by default for any of the layers of the memory channel interleaving hierarchy for which software memory channel interleaving management is not selected and/or enabled. In some embodiments, the hybrid configuration software may configure the processor system 204 to select and/or enable hardware memory channel interleaving management for any of the layers of the memory channel interleaving hierarchy for which software memory channel interleaving management is not selected and/or enabled. In some embodiments, the hybrid configuration software may configure the processor system 204 to select and/or enable hardware memory channel interleaving management for any of the layers of the memory channel interleaving hierarchy indicated by the configuration signal for implementing hardware memory channel interleaving management.

Memory maps for the different layers of the memory channel interleaving hierarchy may be configured to present views of the memory to the processor system 204 to enable implementing hardware and software hybrid configuration of memory channel interleaving management. The memory maps may be configured to present the memory in a way that reflects regions in which software memory channel interleaving management may be implemented. The memory maps may map the locations of the memory for associated memory channel groups of one or more layers of the memory channel interleaving hierarchy. The memory may be undifferentiated for hardware memory channel interleaving management. However, for software memory channel interleaving management, the memory maps may differentiate the memory channel groups for which software memory channel interleaving management applies.

The hybrid configuration software may configure the processor system 204 to retrieve and interpret memory maps for the layers of the memory channel interleaving hierarchy for which software memory channel interleaving management is selected and/or enabled. The processor system 204 may implement software memory channel interleaving management for locations of the memory indicated by the memory maps. The memory maps may be stored at a storage memory (e.g., storage memory 24 in FIG. 1) of the computing device and loaded to a memory controller memory 206, such as a cache memory, for implementation of software memory channel interleaving management by the processor system 204. In some embodiments, the memory maps may be stored at the memory controller memory 206, such as a read only memory, and executed from or loaded to another portion of the memory controller memory 206, such as a cache memory, for implementation of software memory channel interleaving management by the processor system 204.

In some embodiments, the hybrid configuration software may configure the processor system 204 to select and/or enable integrated circuits of the memory channel interleaving integrated circuit system 210 for the layers of the memory channel interleaving hierarchy for which hardware memory channel interleaving management is selected and/or enabled. For example, an integrated circuit may be selected by the processor system 204 setting a value of a signal, such as at a register and/or pin of the memory channel interleaving integrated circuit system 210. The signal may be configured to indicate to the memory channel interleaving integrated circuit system 210 which of the integrated circuits to implement for hardware memory channel interleaving management. The select and/or enable integrated circuits of the memory channel interleaving integrated circuit system 210 may implement hardware memory channel interleaving management for associated layers of the memory channel interleaving hierarchy.

Figure 3:
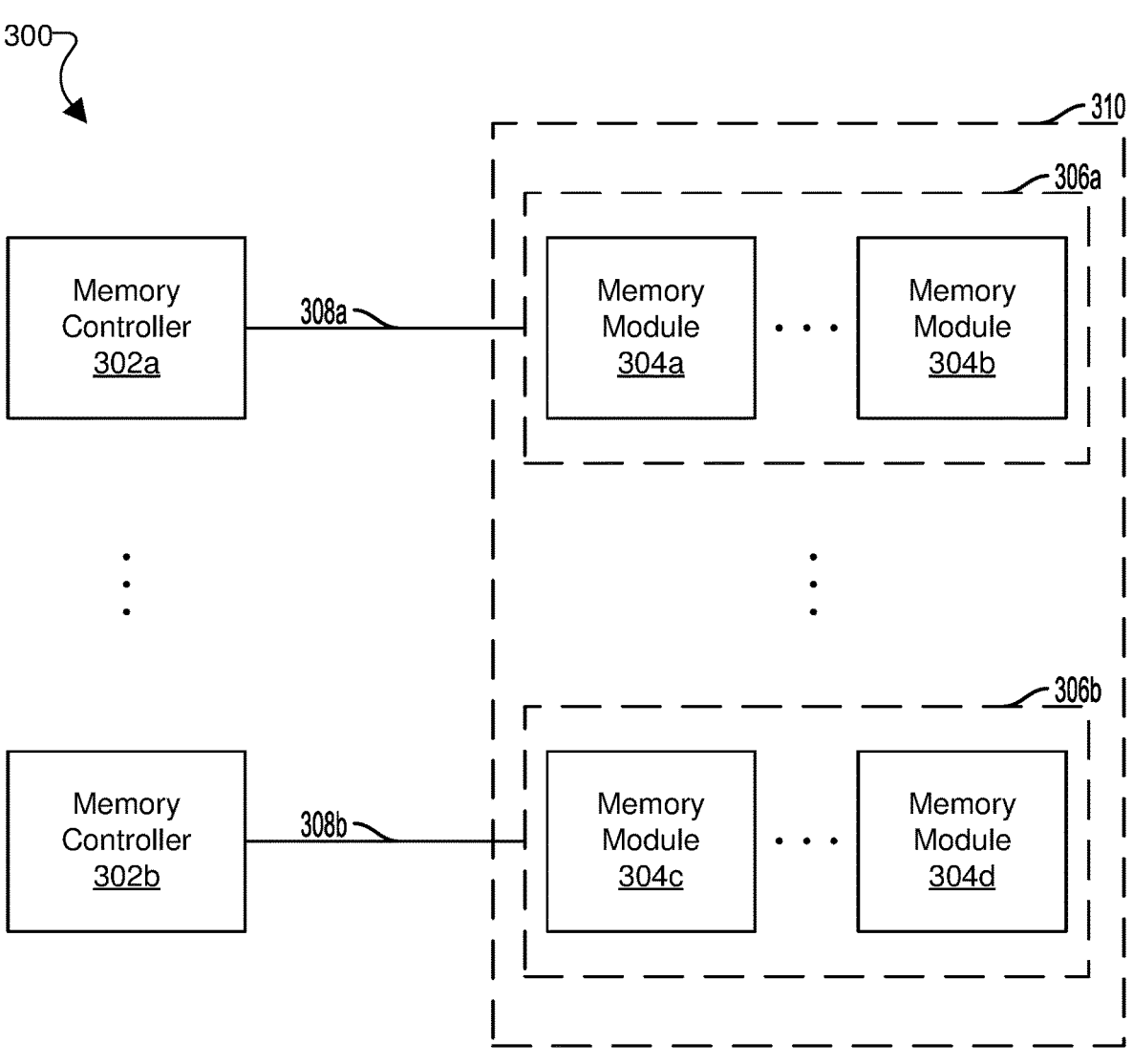
FIG. 3 is a component block diagram illustrating an example memory subsystem of the computing device suitable for implementing various embodiments.

FIG. 3 illustrates an example memory subsystem 300 of the computing device (e.g., computing device 10 in FIG. 1) suitable for implementing various embodiments. With reference to FIGS. 1-3, the memory subsystem 300 may include various memory controllers 302*a*, 302*b* (e.g., memory interface 34 in FIG. 1, memory controller 200 in FIG. 2) connected to a memory 310 (e.g., memory 36 in FIG. 1). The memory 310 may include multiple portions of the memory 306*a*, 306*b*. The different portions of the memory 306*a* and 306*b* may be logical and/or physical portions of the memory 310. Each memory controller 302*a*, 302*b* may be connected to a different portion of the memory 306*a*, 306*b*.

In some embodiments, the different portions of the memory 306*a*, 306*b* may include one or more memory modules 304*a*, 304*b*, 304*c*, 304*d*. In some embodiments, each portion of the memory 306*a*, 306*b* may be a portion of and/or all of an in-line memory module, and the one or more memory modules 304*a*, 304*b*, 304*c*, 304*d* may be individual memory chips. In some embodiments, each portion of the memory 306*a*, 306*b* may be a portion of and/or all of a memory package, and the one or more memory modules 304*a*, 304*b*, 304*c*, 304*d* may be individual memory dies. In some embodiments, each portion of the memory 306*a*, 306*b* may be a partition of a memory space, and the one or more memory modules 304*a*, 304*b*, 304*c*, 304*d* may be locations within the memory space that are part of respective partitions.

Connections between each memory controller 302*a*, 302*b* and a portion of the memory 306*a*, 306*b* is a memory channel 308*a*, 308*b*. Memory channels 308*a*, 308*b* may be grouped into channel groups, as described further herein, for inclusion in layers of the memory channel interleaving hierarchy and for use in memory channel interleaving.

Figure 4:
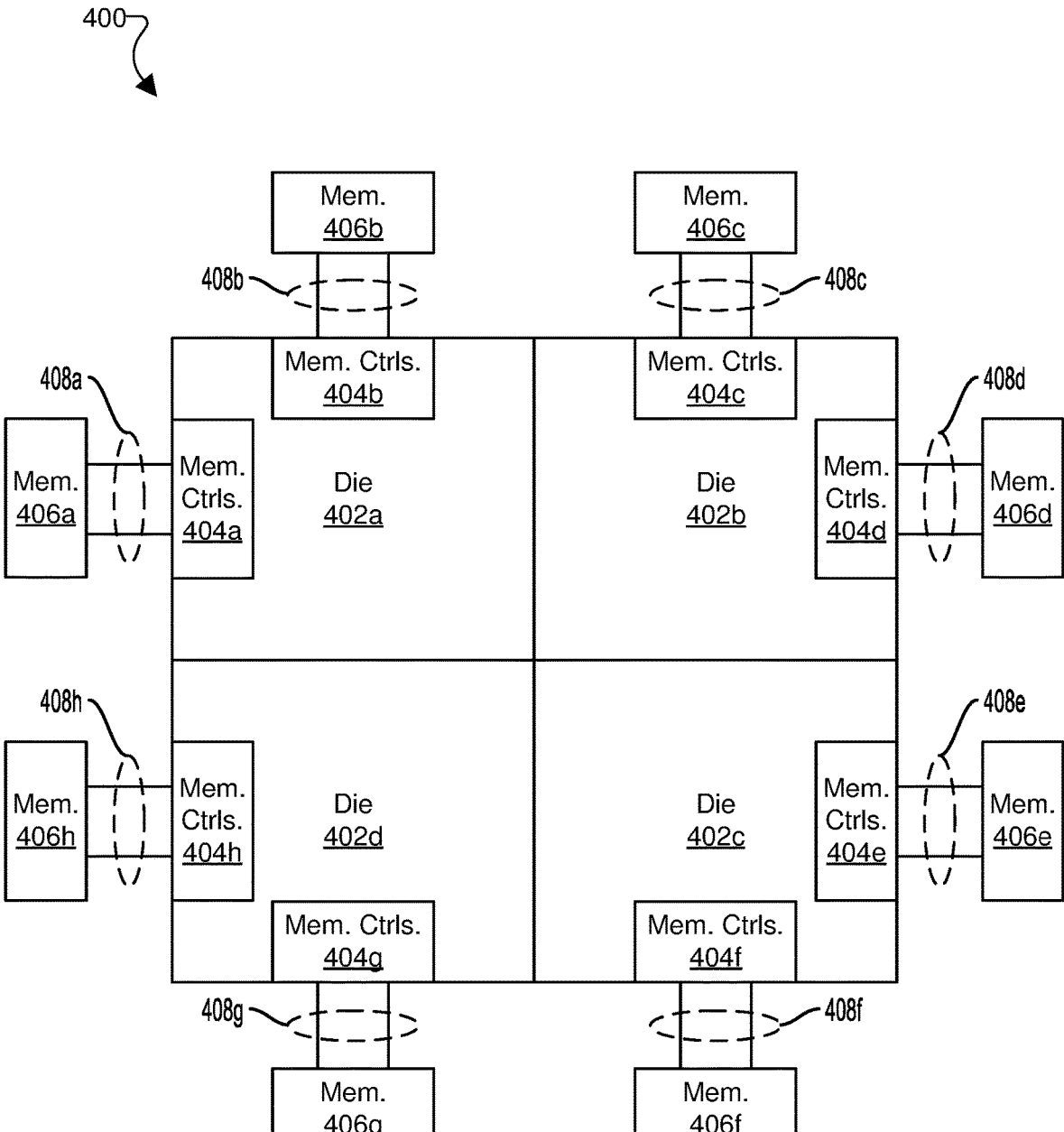
FIG. 4 is a component block diagram illustrating an example computing system of the computing device suitable for implementing various embodiments.

FIG. 4 illustrates an example computing system 400 of the computing device (e.g., computing device 10 in FIG. 1) suitable for implementing various embodiments. With reference to FIGS. 1-4, the computing system 400 is a multi-die computing system including multiple dies 402*a*, 402*b*, 402*c*, 402*d* (e.g., SoC 12 in FIG. 1). The computing system 400 may include multiple dies 402*a*-402*d*, such as two or more. While the example in FIG. 4 illustrates multiple dies 402*a*-402*d*, in some embodiments, the computing system 400 may include a single die which may be implemented similarly to one of the multiple dies 402*a*-402*d*.

Each of the multiple dies 402*a*-402*d* may be connected to each other via a die-to-die interface (not shown). Each of the multiple dies 402*a*-402*d* may include at least two memory controllers 404*a*, 404*b*, 404*c*, 404*d*, 404*e*, 404*f*, 404*g*, 404*h* ("mem. ctrls . . . " in FIG. 4), such as memory interface 34 in FIG. 1, memory controller 200, 302*a*, 302*b* in FIGS. 2 and 3. Each memory controller 404*a*-404*h* may be connected to a memory 406*a*, 406*b*, 406*c*, 406*d*, 406*e*, 406*f*, 406*g*, 406*h* ("mem." in FIG. 4), such as memory 36, 310 in FIGS. 1 and 3, memory modules 304*a*, 304*b*, 304*c*, 304*d*, and/or portion of the memory 306*a*, 306*b* in FIG. 3. Each memory 406*a*-406*h* may be logical and/or physical portion of a larger memory of a memory subsystem (e.g., memory subsystem 300 in FIG. 3).

Each connection between one of the memory controllers 404*a*-404*h* and one of the memories 406*a*-406*h* may be a memory channel (e.g., memory channel 308, 308*b* in FIG. 3), which may be a logical and/or physical connection. At least two channels between at least two memory controllers 404*a*-404*h* of a die 402*a*-402*d* and a memory 406*a*-406*h* may be grouped together as a memory channel group 408*a*, 408*b*, 408*c*, 408*d*, 408*e*, 408*f*, 408*g*, 408*h*.

The memory controllers 404*a*-404*h* may be configured with software implemented by a processor system (e.g., processor 14 in FIG. 1, processor system 204 in FIG. 2), including one or more processors (e.g., processor 14 in FIG. 1), configured for software memory channel interleaving management. The memory controllers 404*a*-404*h* may also include hardware (e.g., memory channel interleaving integrated circuit system 210 in FIG. 2) configured for hardware memory channel interleaving management. The memory controllers 404*a*-404*h* may also be configured with software implemented by the processor system configured for hardware and software hybrid configuration of memory channel interleaving management, which may configure the memory controllers 404*a*-404*h* for software and hardware memory channel interleaving management.

The memory controllers 404*a*-404*h* implementing hardware and software hybrid configuration of memory channel interleaving management may be configured to implement software memory channel interleaving management for at least one layer of the memory channel interleaving hierarchy. The memory controllers 404*a*-404*h* implementing hardware and software hybrid configuration of memory channel interleaving management may also be configured to implement hardware memory channel interleaving management for at least one layer of the memory channel interleaving hierarchy. In some embodiments, the memory controllers 404*a*-404*h* implementing hardware and software hybrid configuration of memory channel interleaving management may be configured to implement software or hardware memory channel interleaving management for all layers of the memory channel interleaving hierarchy.

For example, the memory controllers 404*a*-404*h* may be configured to implement software memory channel interleaving management for one or more of the intra-memory channel group layer, the inter-memory channel group layer, or the inter-die memory channel group layer. And the memory controllers 404*a*-404*h* may be configured to implement hardware memory channel interleaving management for a different one or more of the intra-memory channel group layer, the inter-memory channel group layer, or the inter-die memory channel group layer. In other words, the memory controllers 404*a*-404*h* may be configured to implement memory channel interleaving management for each of the layers of the memory channel interleaving hierarchy by one of software memory channel interleaving management and hardware memory channel interleaving management, respectively.

How the memory controllers 404a-404h are configured for software or hardware memory channel interleaving management for all layers of the memory channel interleaving hierarchy may depend on developer and/or manufacturer settings generally and/or for specific use cases. The signaling mechanism, such as any combination of registers, electronic fuses, and/or pins, of the memory controllers 404a-404h may signal the memory controllers 404a-404h to implement a configuration of hardware and software hybrid configuration of memory channel interleaving management. The signaling mechanism may be set by a developer and/or a manufacturer for general implementation and/or specific circumstances. In some embodiments, the signaling mechanism may be preset with a value of the configuration signal. In some embodiments, the signaling mechanism may be set at runtime by the memory controllers 404a-404h writing a value of the configuration signal at the signaling mechanism. In some embodiments, the signaling mechanism set for general implementation may indicate a default configuration of the memory controllers 404a-404h for software or hardware memory channel interleaving management for one or more layers of the memory channel interleaving hierarchy. In some embodiments, the signaling mechanism set for a specific circumstance may indicate a configuration of the memory controllers 404a-404h for software or hardware memory channel interleaving management for one or more layers of the memory channel interleaving hierarchy based on the specific circumstance. For example, the specific circumstance may include a software image loaded during boot stage of a host device (e.g., SoC 12, processor 14, peripheral device 40 in FIG. 1), a mode of operation of the host device (e.g., based on available power, security setting, performance setting, etc.), receiving a software or hardware memory channel interleaving management configuration command from an application executed by the host device, etc.

The memory controllers 404a-404h may configure the processor system and the hardware of the memory controllers 404a-404h for software and hardware memory channel interleaving management according to the configuration signal of the signaling mechanism. For example, memory controllers 404a-404h may select and/or enable software or hardware memory channel interleaving management for certain layers of the memory channel interleaving hierarchy. The memory controllers 404a-404h may also load one or more memory maps providing the memory controllers 404a-404h with views of the memories 406a-406h at the one or more layers of the memory channel interleaving hierarchy for which the memory controllers 404a-404h are configured for software or hardware memory channel interleaving management.

A component (e.g., processor 14, peripheral device 40 in FIG. 1) of and/or connected to one of the dies 402a-402d may transmit a memory access command for reading and/or writing to the memory 406a-406h. The memory access command may be received by the memory controllers 404a-404h at one or more of the dies 402a-402d. The memory controllers 404a-404h, implementing hardware and software hybrid configuration of memory channel interleaving management, may execute hardware and software memory channel interleaving management to a respective memory 406a-406h.

The memory access command may be interleaved across at least two memory channels of at least one memory channel group depending on the memory location for the memory access command. In some embodiments, a location of the memory access command located in the memory 406a-406h at the intra-memory channel group layer may be interleaved across at least two memory channels of one memory channel group 408a-408h for one die 402a-402d. In some embodiments, a location of the memory access command located in the memory 406a-406h at the inter-memory channel group layer may be interleaved across at least two memory channels of at least two memory channel groups 408a-408h for one die 402a-402d. In some embodiments, a location of the memory access command located in the memory 406a-406h at the inter-die memory channel group layer may be interleaved across at least two memory channels of at least two memory channel groups 408a-408h for at least two dies 402a-402d.

Whether the interleaving of the memory access command is implemented by the processor systems or the hardware of the memory controller 404a-404h may be based on the configuration of memory controller 404a-404h implemented according to hardware and software hybrid configuration of memory channel interleaving management. For example, for a location of the memory access command located in memory 406a-406h at a layer of the memory channel interleaving hierarchy for which software memory channel interleaving management is configured, the processor system may interleave of the memory access command. As another example, for a location of the memory access command located in memory 406a-406h at a layer of the memory channel interleaving hierarchy for which hardware memory channel interleaving management is configured, the hardware may interleave of the memory access command.

Figure 5A:
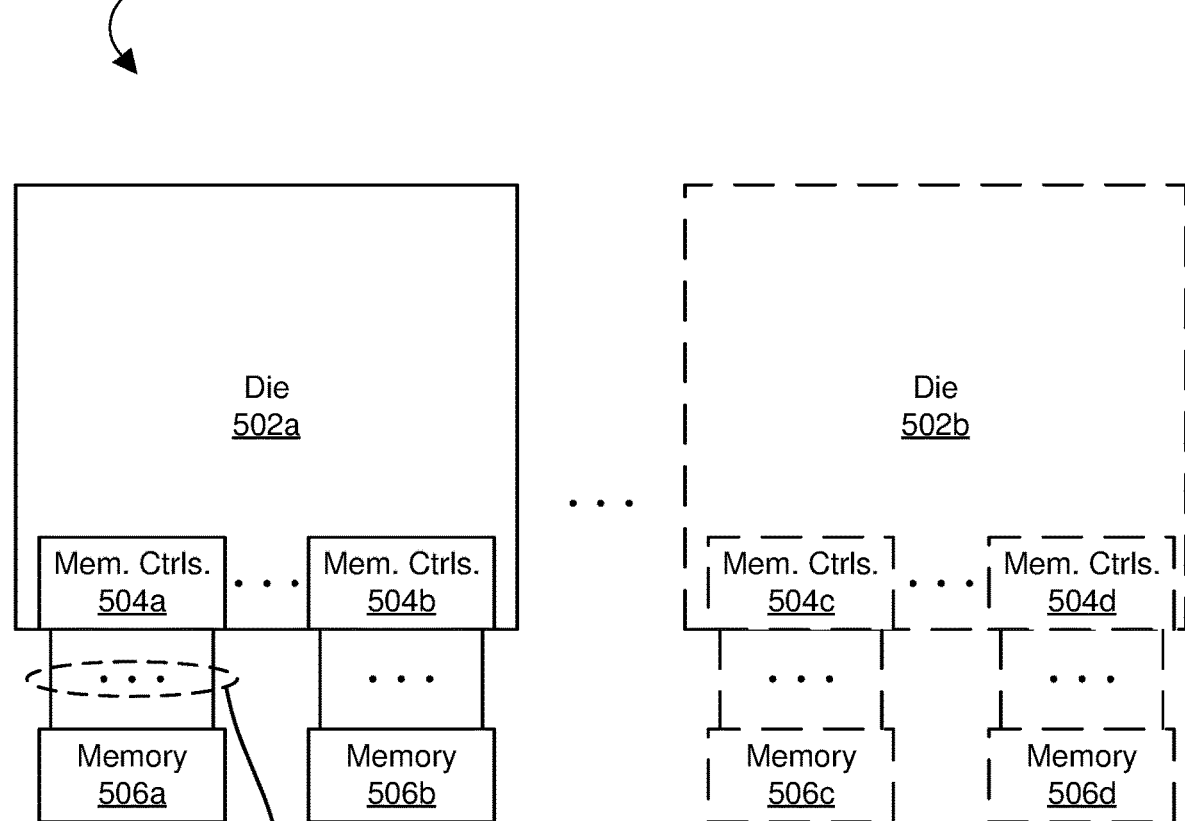
Figure 5B:
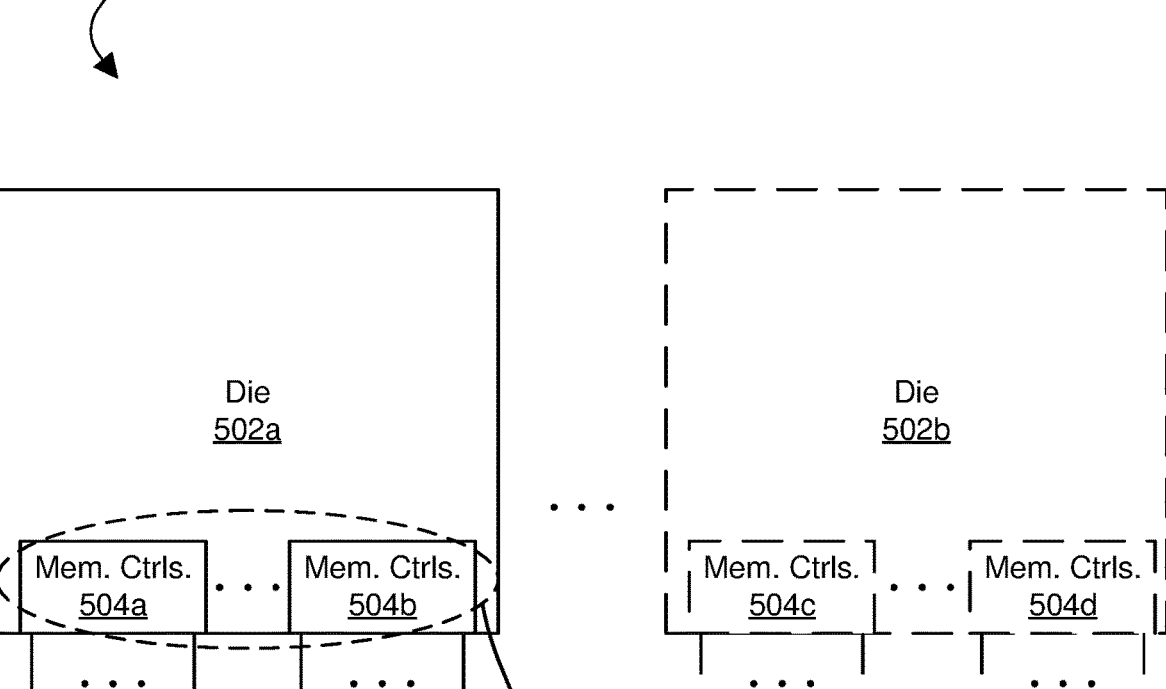

FIGS. 5A-5C illustrate examples of layers 508, 510, 512 of the memory channel interleaving hierarchy of the memory subsystem (e.g., memory subsystem 300 in FIG. 3) of the computing device (e.g., computing device 10 in FIG. 1, computing system 400 in FIG. 4) suitable for implementing various embodiments. With reference to FIGS. 1-5C, a computing system 500a, 500b, 500c (e.g., computing device 10 in FIG. 1, computing system 400 in FIG. 4) may include at least one die 502a, 502b (e.g., SoC 12 in FIG. 1, die 402a-402d in FIG. 4). Each die 502a, 502b may include at least one memory controller 504a, 504b, 504c, 504d ("mem. ctrls." in FIGS. 5A-5C) (e.g., memory interface 34 in FIG. 1, memory controller 200, 302a, 302b, 404a-404h in FIGS. 2-4). Each memory controller 504a-504d may be connected to a memory 506a, 506b, 506c, 506d ("mem. ctrls." in FIG. 4) (e.g., memory 36, 310, 406a-406h in FIGS. 1, 3, and 4, memory modules 304a, 304b, 304c, 304d, portion of the memory 306a, 306b in FIG. 3). Each memory 506a-506d may be logical and/or physical portion of a larger memory of the memory subsystem 500a-500c.

Each connection between one of the memory controllers 504a-504d and one of the memories 506a-506d may be a memory channel (e.g., memory channel 308, 308b in FIG. 3), which may be a logical and/or physical connection. For example, a memory channel may be a logical connection created based on hardware, software, and/or firmware assigning the logical connection between one of the memory controllers 504a-504d and one of the memories 506a-506d. The logical connection may be implemented over one of various possible physical connections for the one of the memory controllers 504a-504d and/or the one of the memories 506a-506d. As another example, a memory channel may be a physical connection between one of the memory controllers 504a-504d and one of the memories 506a-506d. The physical connection may be a designated physical connection between one of the memory controllers 504a-504d and one of the memories 506a-506d and/or one of various possible physical connections for one of the memory controllers 504a-504d and/or one of the memories 506a-506d assigned by the hardware, software, and/or firmware. At least two channels between at least two memory controllers 504a-504d of a die 502a, 502b and a memory 506a-506d may be grouped together as a memory channel group (e.g., memory channel group 408a-408h in FIG. 4).

The example in FIG. 5A illustrates an intra-memory channel group layer 508 of the memory channel interleaving hierarchy including one memory channel group of one die 502a, 502b. The memory controllers 504a-504d of the memory channel group may be configured to interleave memory access commands across the memory channels of the memory channel group for a location of the memory access command within the intra-memory channel group layer 508.

The memory controllers 504a-504d may be configured to interleave memory access commands across the memory channels of the memory channel group via the processor systems (e.g., processor 14 in FIG. 1, processor system 204 in FIG. 2) of the memory controllers 504a-504d when configured for software memory channel interleaving for the intra-memory channel group layer 508. The memory controllers 504a-504d may be configured to interleave memory access commands across the memory channels of the memory channel group via the hardware (e.g., memory channel interleaving integrated circuit system 210 in FIG. 2) of the memory controllers 504a-504d when configured for hardware memory channel interleaving for the intra-memory channel group layer 508.

The example in FIG. 5B illustrates an inter-memory channel group layer 510 of the memory channel interleaving hierarchy including at least two memory channel groups of one die 502a, 502b. The memory controllers 504a-504d of the memory channel groups may be configured to interleave memory access commands across the memory channels of the memory channel groups for a location of the memory access command within the inter-memory channel group layer 510.

The memory controllers 504a-504d may be configured to interleave memory access commands across the memory channels of the memory channel groups via the processor systems (e.g., processor 14 in FIG. 1, processor system 204 in FIG. 2) of the memory controllers 504a-504d when configured for software memory channel interleaving for the inter-memory channel group layer 510. The memory controllers 504a-504d may be configured to interleave memory access commands across the memory channels of the memory channel groups via the hardware (e.g., memory channel interleaving integrated circuit system 210 in FIG. 2) of the memory controllers 504a-504d when configured for hardware memory channel interleaving for the inter-memory channel group layer 510.

The example in FIG. 5C illustrates an inter-die memory channel group layer 512 of the memory channel interleaving hierarchy including at least two memory channel groups of at least two dies 502a, 502b. The memory controllers 504a-504d of the memory channel groups may be configured to interleave memory access commands across the memory channels of the memory channel groups for a location of the memory access command within the inter-die memory channel group layer 512.

The memory controllers 504a-504d may be configured to interleave memory access commands across the memory channels of the memory channel groups via the processor systems (e.g., processor 14 in FIG. 1, processor system 204 in FIG. 2) of the memory controllers 504a-504d when configured for software memory channel interleaving for the inter-die memory channel group layer 512. The memory controllers 504a-504d may be configured to interleave memory access commands across the memory channels of the memory channel groups via the hardware (e.g., memory channel interleaving integrated circuit system 210 in FIG. 2) of the memory controllers 504a-504d when configured for hardware memory channel interleaving for the inter-die memory channel group layer 512.

The layers 508, 510, 512 of the memory channel interleaving hierarchy illustrated in FIGS. 5A-5C are not intended to limit the scope of the description or claims. Other configurations of layers of the memory channel interleaving hierarchy having at least one memory channel group may be similarly implemented to the layers 508, 510, 512 described herein. For example, layers may encompass one or more specific memory channel groups and/or one or more specific dies. As another example, layers may encompass at least two memory channel groups across connected computing devices, such as connected mobile devices, connected servers, etc.

Figure 6A:
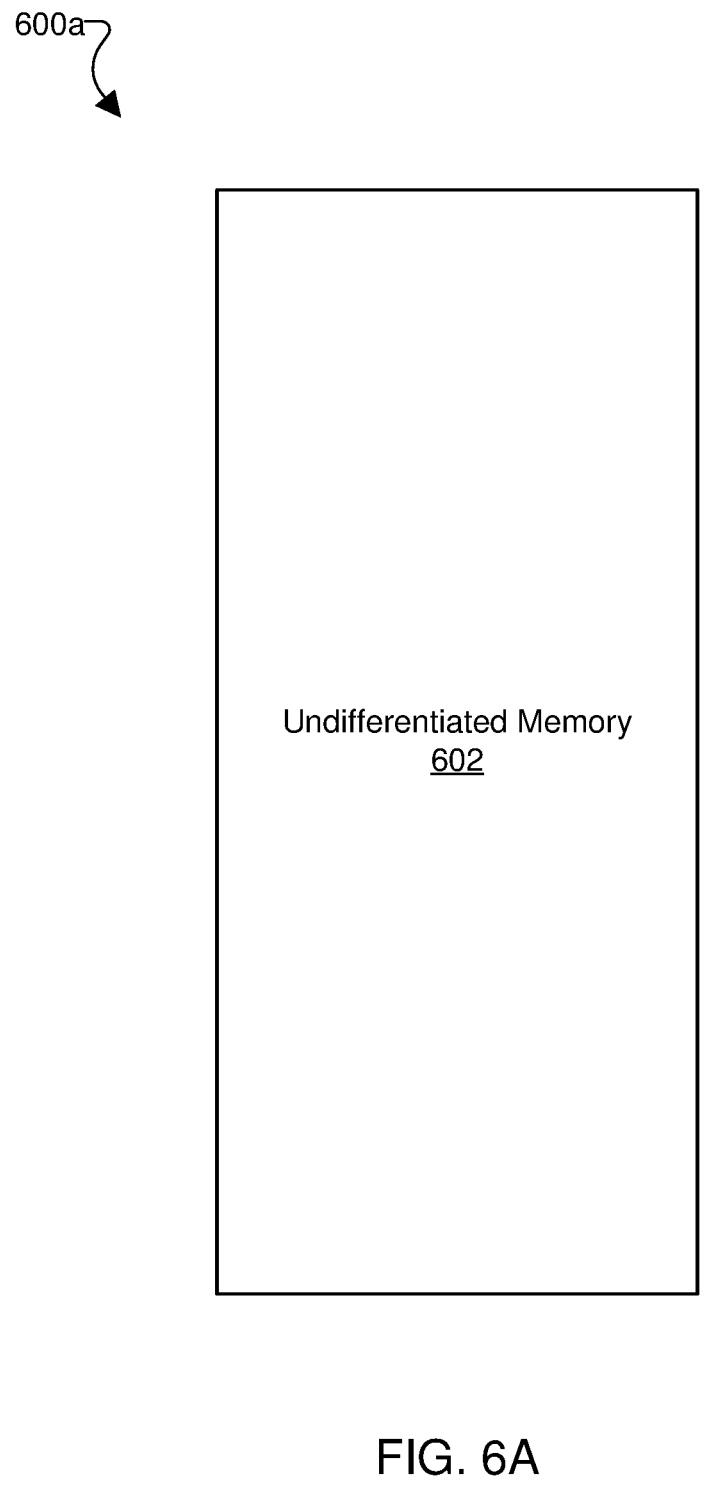
Figure 6B:
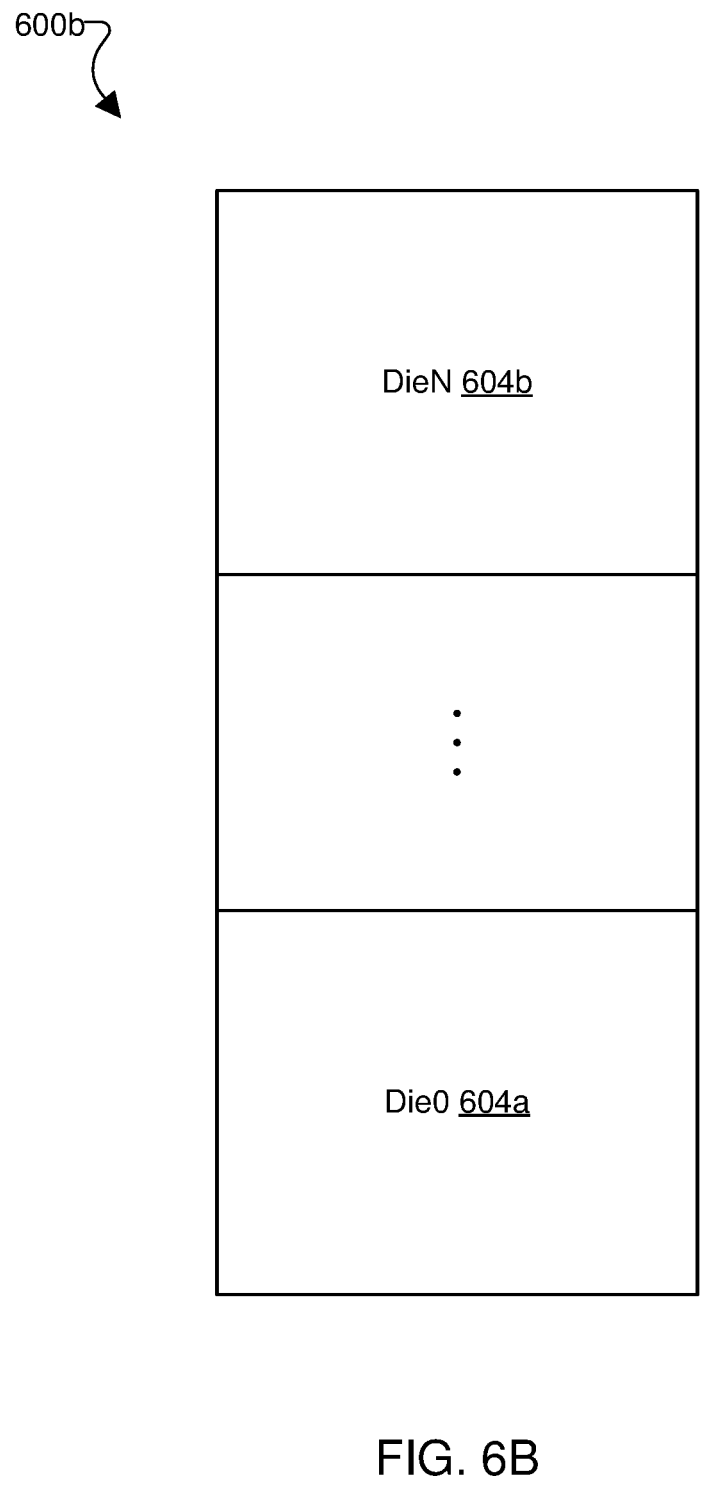
Figure 6C:
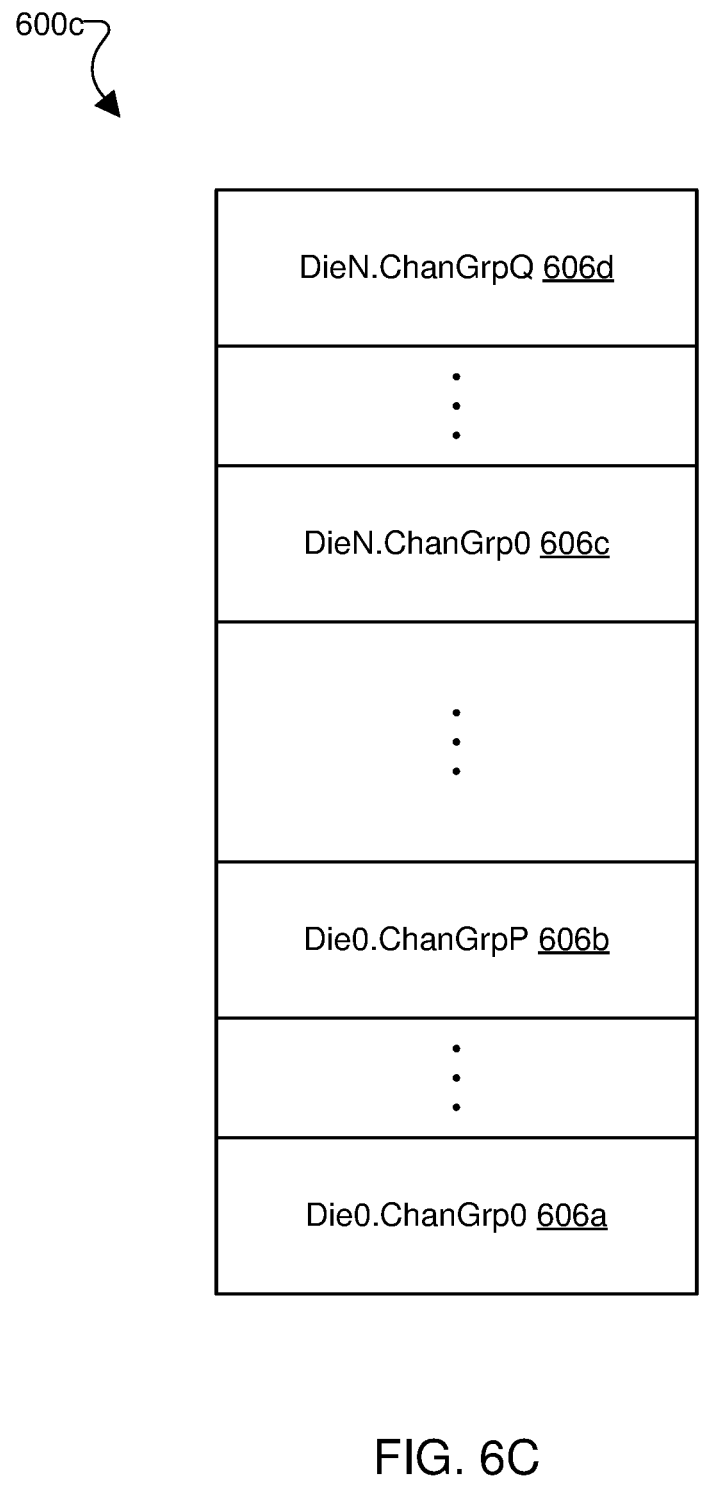

FIGS. 6A-6C illustrate examples of memory maps 600a, 600b, 600c of layers (e.g., layer 508, 510, 512 in FIGS. 5A-5C) of the memory channel interleaving hierarchy of the memory subsystem (e.g., memory subsystem 300 in FIG. 3) of the computing device (e.g., computing device 10 in FIG. 1, computing system 400, 500a-500c in FIGS. 4-5C) suitable for implementing various embodiments. With reference to FIGS. 1-6C the memory maps 600a-600c may be generated by a developer and/or manufacturer and stored to the computing device at a storage memory (e.g., storage memory 24 in FIG. 1, memory controller memory 206 in FIG. 2) of the computing device and/or the memory controllers (e.g., memory interface 34 in FIG. 1, memory controller 200, 302a, 302b, 404a-404h, 504a-504d in FIGS. 2-5C).

The memory maps 600a-600c for the different layers of the memory channel interleaving hierarchy may be configured to present views of the memory (e.g., memory 36, 310, 406a-406h, 506a-506d in FIGS. 1 and 3-5C, memory modules 304a, 304b, 304c, 304d, portion of the memory 306a, 306b in FIG. 3) of the memory subsystem. The views of the memory may be provided to the processor systems (e.g., processor 14 in FIG. 1, processor system 204 in FIG. 2) of the memory controllers to enable implementing hardware and software hybrid configuration of memory channel interleaving management. The memory maps 600a-600c may be configured to present the memory in a way that reflects regions in which software memory channel interleaving management may be implemented. The memory maps 600a-600c may map the locations of the memory for associated memory channel groups (e.g., memory channel group 408a-408h in FIG. 4) of one or more of the layers of the memory channel interleaving hierarchy. The memory maps 600a-600c may map the locations of the memory at different levels of granularity depending on the layer of the memory channel interleaving hierarchy at which software memory channel interleaving management may be implemented. For example, for software memory channel interleaving management at the inter-die memory channel group layer (e.g., inter-die memory channel group layer 512 in FIG. 5C) of the memory channel interleaving hierarchy, the memory map 600b may map memory locations of a memory space to individual dies. As another example, for software memory channel interleaving management at the inter-memory channel group layer (e.g., inter-memory channel group layer 510 in FIG. 5B) of the memory channel interleaving hierarchy, the memory map 600c may map memory locations of a memory space to individual memory channel groups of individual dies.

The example in FIG. 6A illustrates a memory map 600a for hardware memory channel interleaving management at any layer of the memory channel interleaving hierarchy. In other words, all memory channel interleaving for the memory may be implemented via hardware memory channel interleaving management and not by software memory channel interleaving management. The memory map 600a may map the memory as undifferentiated memory 602 across all of the memory. In other words, the memory map 600a may map the memory as a contiguous memory irrespective of layer of the memory channel interleaving hierarchy. When all memory channel interleaving for the memory is implemented via hardware memory channel interleaving management, differentiating the memory for software memory channel interleaving management may be unnecessary. The hardware used for hardware memory channel interleaving management may be configured without use of the memory maps 600a-600c configured to present the memory in a way that reflects regions in which software memory channel interleaving management may be implemented.

The examples in FIGS. 6B and 6C illustrate the memory maps 600b, 600c for software memory channel interleaving management at the various layers of the memory channel interleaving hierarchy. The memory maps 600b, 600c may differentiate the memory of the dies (e.g., SoC 12 in FIG. 1, die 402a-402d, 502a, 502b in FIGS. 4-5C) for varying granularity.

The example in FIG. 6B illustrates the memory map 600b for software memory channel interleaving management at the inter-die memory channel group layer (e.g., inter-die memory channel group layer 512 in FIG. 5C) of the memory channel interleaving hierarchy. Software memory channel interleaving management at the inter-die memory channel group layer may be implemented across the memory of multiple memory channel groups of multiple dies 604a, 604b (e.g., Die0 to DieN, where N is a number greater than 1). The memory map 600b may differentiate the memory of the dies 604a, 604b. The memory for each die 604a, 604b may include the memory associated with the memory channels of each die, respectively. For example, the memory for Die0 604a represented in the memory map 600b may include the memory associated with the memory channels between the memory Die0 604a and two or more memory controllers (e.g., memory interface 34 in FIG. 1, memory controller 200, 302a, 302b, 404a-404h, 504a-504d in FIGS. 2-5C). The memory for DieN 604b represented in the memory map 600b may include the memory associated with the memory channels between the memory of DieN 604b and two or more memory controllers. The memory map 600b may map the memory space of the memory subsystem for each die 604a, 604b as separate, contiguous memory spaces. For example, the memory map 600b may present a view of the memory for Die0 604a to software executed by two or more memory controllers implementing software memory channel interleaving management as a contiguous memory space. The memory map 600b may also present a view of the memory for DieN 604b to software executed by two or more memory controllers implementing software memory channel interleaving management as another contiguous memory space.

The example in FIG. 6C illustrates the memory map 600c for software memory channel interleaving management at the inter-memory channel group layer (e.g., inter-memory channel group layer 510 in FIG. 5B) of the memory channel interleaving hierarchy. Software memory channel interleaving management at the inter-memory channel group layer may be implemented across the memory of multiple memory channel groups 606a, 606b, 606c, 606d of individual dies (e.g., Die0 to DieN, where N is a number greater than 1). The memory map 600c may differentiate the memory of the memory channel groups 606a-606d per die, such as Die0.ChanGrp0 to DieN.ChanGrpQ, including Die0.ChanGrpP and DieN.ChanGrp0, in which N, P, and Q are numbers greater than 1. The memory for each memory channel group 606a-606d per die may include the memory associated with the memory channels of each memory channel group of each die, respectively. For example, the memory for the memory channel group Die0.ChanGrp0 606a represented in the memory map 600c may include the memory associated with the memory channels of the memory channel group Die0.ChanGrp0 606a between Die0 and two or more memory controllers (e.g., memory interface 34 in FIG. 1, memory controller 200, 302a, 302b, 404a-404h, 504a-504d in FIGS. 2-5C). Similarly, the memory for the memory channel group Die0.ChanGrpP 606b represented in the memory map 600c may include the memory associated with the memory channels of the memory channel group Die0.ChanGrpP 606b between Die0 and two or more memory controllers Also similarly, the memory for the memory channel group DieN.ChanGrp0 606c and the memory channel group DieN.ChanGrpQ 606d represented in the memory map 600c may include the memory associated with the memory channels of the memory channel group DieN.ChanGrp0 606c and the memory channel group DieN.ChanGrpQ 606d between DieN and two or more memory controllers. The memory map 600c may map the memory space of the memory subsystem for each channel group 606a-606d per die as separate, contiguous memory spaces. For example, the memory map 600c may present a view of the memory for the memory channel group Die0.ChanGrp0 606a to software executed by two or more memory controllers implementing software memory channel interleaving management as a contiguous memory space. The memory map 600c may similarly present views of each of the memories for the memory channel groups Die0.ChanGrpP 606b, DieN.ChanGrp0 606c, and DieN-.ChanGrpQ 606d, to software executed by two or more memory controllers implementing software memory channel interleaving management as contiguous memory spaces, respectively.

The memory maps 600a-600c illustrated in FIGS. 6A-6C do not limit the scope of the description or claims. It is noted that other configurations of the memory maps may map the memory space of the memory subsystem as non-contiguous memory spaces and the ordering of the mapping the memory space may be sequential, non-sequentially patterned, and/or arbitrary.

The hybrid configuration software may configure the processor system to retrieve and interpret memory maps 600a-600c for the layers of the memory channel interleaving hierarchy for which software memory channel interleaving management is selected and/or enabled. The processor system may implement software memory channel interleaving management for locations of the memory indicated by the memory maps 600a-600c.

FIG. 7 illustrates an example method for configuring a memory subsystem (e.g., memory subsystem 300 in FIG. 3) for implementing hardware and software hybrid configuration of memory channel interleaving management according to an embodiment. With reference to FIGS. 1-7, the method 700 may be implemented in a computing device (e.g., computing device 10 in FIG. 1, computing system 400, 500a-500c in FIGS. 4-5C), in hardware (e.g., memory interface 34 in FIG. 1, memory controller 200, 302a, 302b, 404a-404h, 504a-504d in FIGS. 2-5C, memory channel interleaving integrated circuit system 210), in software executing in a processor (e.g., processor 14 in FIG. 1, memory controller 200, 302a, 302b, 404a-404h in FIGS. 2-4, processor system 204 in FIG. 2), or in a combination of a software-configured processor and dedicated hardware, such as the memory controller (e.g., memory interface 34 in FIG. 1, memory controller 200, 302a, 302b, 404a-404h, 504a-504d in FIGS. 2-5C), that includes other individual components, such as various memories/caches (e.g., memory controller memory 206 in FIG. 2). In order to encompass the alternative configurations enabled in various embodiments, the hardware implementing the method 700 is referred to herein as a "memory controller device."

In block 702, the memory controller device may store memory maps (e.g., memory maps 600a-600c in FIGS. 6A-6C) for the memory channel interleaving hierarchy for hardware and software hybrid configuration of memory channel interleaving management. The memory maps may be stored in the computing device at a storage memory (e.g., storage memory 24 in FIG. 1, memory controller memory 206 in FIG. 2) of the computing device and/or the memory controllers. In some embodiments, the memory controller device storing the memory maps for the memory channel interleaving hierarchy for hardware and software hybrid configuration of memory channel interleaving management in block 702 may include a processor (e.g., processor 14 in FIG. 1), a memory controller (e.g., memory interface 34 in FIG. 1, memory controller 200, 302a, 302b, 404a-404h, 504a-504d in FIGS. 2-5C), and/or a processor system (e.g., processor system 204 in FIG. 2).

A developer and/or manufacturer may generate the memory maps of various views of the memory (e.g., memory 36, 310, 406a-406h, 506a-506d in FIGS. 1 and 3-5C, memory modules 304a, 304b, 304c, 304d, portion of the memory 306a, 306b in FIG. 3) of the memory subsystem. The memory maps may be provided to the processor systems (e.g., processor 14 in FIG. 1, processor system 204 in FIG. 2) of the memory controllers to enable implementing hardware and software hybrid configurations for memory channel interleaving management. The memory maps may be configured to present the memory in a way that reflects regions in which software memory channel interleaving management may be implemented. The memory maps may map the locations of the memory for associated memory channel groups (e.g., memory channel group 408a-408h in FIG. 4) of one or more of the layers (e.g., layer 508, 510, 512 in FIGS. 5A-5C) of the memory channel interleaving hierarchy. During manufacturing, assembly, and/or configuration, such as programming, of the computing device and/or memory subsystem, the memory maps may be stored to the storage memory.

In block 704, the memory controller device may configure at least one signaling mechanism to signal to at least one memory controller at least one layer of the memory channel interleaving hierarchy for hardware and software hybrid configuration of memory channel interleaving management. A signaling mechanism may be part of a memory controller memory (e.g., memory controller memory 206 in FIG. 2), such as a register and/or eFuse, and/or a pin of the memory controller, such as part of a host interface (e.g., host interface 202), connected to a host device (e.g., SoC 12, processor 14, peripheral device 40 in FIG. 1). The signaling mechanism may be configured to provide a configuration signal to the memory controller. The configuration signal may be a value set at the signaling mechanism configured to indicate to the memory controller for which layer of the memory channel interleaving hierarchy to implement software and/or hardware memory channel interleaving management.

A developer and/or manufacturer may configure the signaling mechanism to provide the configuration signal to the memory controller. In some embodiments, at least one configuration signal value may be stored to at least one signaling mechanism. In some embodiments, a software, firmware, and/or hardware may be configured to provide at least one configuration signal value to the memory controller via at least one signaling mechanism according to at least one criterion. In some embodiments, the memory controller device configuring the at least one signaling mechanism to signal to the at least one memory controller the at least one layer of the memory channel interleaving hierarchy for hardware and software hybrid configuration of memory channel interleaving management in block 704 may include the processor, the memory controller, and/or the processor system.

FIG. 8 illustrates an example method for configuring a memory subsystem (e.g., memory subsystem 300 in FIG. 3) for implementing hardware and software hybrid configuration of memory channel interleaving management according to an embodiment. With reference to FIGS. 1-8, the method 800 may be implemented in a computing device (e.g., computing device 10 in FIG. 1, computing system 400, 500a-500c in FIGS. 4-5C), in hardware (e.g., memory interface 34 in FIG. 1, memory controller 200, 302a, 302b, 404a-404h, 504a-504d in FIGS. 2-5C, memory channel interleaving integrated circuit system 210 in FIG. 2), in software executing in a processor (e.g., processor 14 in FIG. 1, memory controller 200, 302a, 302b, 404a-404h in FIGS. 2-4, processor system 204 in FIG. 2), or in a combination of a software-configured processor and dedicated hardware, such as the memory controller (e.g., memory interface 34 in FIG. 1, memory controller 200, 302a, 302b, 404a-404h, 504a-504d in FIGS. 2-5C), that includes other individual components, such as various memories/caches (e.g., memory controller memory 206 in FIG. 2). In order to encompass the alternative configurations enabled in various embodiments, the hardware implementing the method 800 is referred to herein as a "memory controller device."

In optional block 801, the memory controller device may write a configuration signal to one or more of the signaling mechanisms configured to signal to the memory controller device at least one layer of the memory channel interleaving hierarchy for software memory channel interleaving management. A signaling mechanism may be part of the memory controller device, such as part of a memory controller memory (e.g., memory controller memory 206 in FIG. 2), including a register and/or eFuse. A signaling mechanism may be part of the memory controller device, such as a pin that may be part of a host interface (e.g., host interface 202) connected to a host device (e.g., SoC 12, processor 14, peripheral device 40 in FIG. 1).

The memory controller device may write a configuration signal at a signaling mechanism. The configuration signal may include a value configured to indicate to the memory controller device for which layer (e.g., layer 508, 510, 512 in FIGS. 5A-5C) of the memory channel interleaving hierarchy to implement software memory channel interleaving management. The configuration signal may be set by software, firmware, and/or hardware according to at least one criterion. For example, the configuration signal associated with a software image may be written to the signaling mechanism during a boot stage of a host device (e.g., SoC 12, processor 14, peripheral device 40 in FIG. 1) based on loading the software image. Implementation of block 801 may be optional as in some embodiments the configuration signal may be pre-set at the signaling mechanism. In some embodiments, the memory controller device writing the configuration signal to the one or more of the signaling mechanisms in optional block 801 may include a processor (e.g., processor 14 in FIG. 1), a memory controller (e.g., memory interface 34 in FIG. 1, memory controller 200, 302*a*, 302*b*, 404*a*-404*h*, 504*a*-504*d* in FIGS. 2-5C), and/or a processor system (e.g., processor system 204 in FIG. 2).

In block 802, the memory controller device may read one or more of the signaling mechanisms configured to signal to the memory controller device at least one layer of the memory channel interleaving hierarchy for software memory channel interleaving management. The memory controller device may read the configuration signal at the signaling mechanism. Reading the configuration signal may include reading the value configured to indicate to the memory controller device the layer of the memory channel interleaving hierarchy to use for implementing software memory channel interleaving management. In some embodiments, the memory controller device reading the one or more of the signaling mechanisms configured to signal to the memory controller device the at least one layer of the memory channel interleaving hierarchy for software memory channel interleaving management in block 802 may include the processor, the memory controller, and/or the processor system.

In block 804, the memory controller device may select the one or more layers of the memory channel interleaving hierarchy for software memory channel interleaving management. The memory controller device may interpret the one or more configuration signals read from the one or more of the signaling mechanisms. The memory controller device may interpret for which layers of the memory channel interleaving hierarchy the one or more configuration signals indicate to implement software memory channel interleaving management. The memory controller device may select from among the layers of the memory channel interleaving hierarchy those layers indicated for software memory channel interleaving management by the one or more configuration signals. In some embodiments, the memory controller device selecting the one or more layers of the memory channel interleaving hierarchy for software memory channel interleaving management in block 804 may include the processor, the memory controller, and/or the processor system.

In block 806, the memory controller device may load one or more memory maps (e.g., memory map 600*a*-600*c* in FIGS. 6A-6C) for the one or more layers of the memory channel interleaving hierarchy for software memory channel interleaving management. The memory maps may be stored in the computing device at a storage memory (e.g., storage memory 24 in FIG. 1, memory controller memory 206 in FIG. 2) of the computing device and/or the memory controllers. The memory controller device may select one or more memory maps associated with the one or more layers of the memory channel interleaving hierarchy corresponding with the configuration signal from among all the memory maps stored at the storage memory. The memory maps may be retrieved from the storage memory and loaded to a memory (e.g., memory 16, 36, 310, 406*a*-406*h*, 506*a*-506*d* in FIGS. 1 and 3-5C, memory controller memory 206 in FIG. 2, memory modules 304*a*, 304*b*, 304*c*, 304*d*, portion of the memory 306*a*, 306*b* in FIG. 3). In some embodiments, the memory controller device loading the one or more memory maps for the one or more layers of the memory channel interleaving hierarchy for software memory channel interleaving management in block 806 may include the processor, the memory controller, and/or the processor system.

The memory maps may provide various views of a memory (e.g., memory 36, 310, 406*a*-406*h*, 506*a*-506*d* in FIGS. 1 and 3-5C, memory modules 304*a*, 304*b*, 304*c*, 304*d*, portion of the memory 306*a*, 306*b* in FIG. 3) of the memory subsystem to the memory controller device and enable the memory controller device to implement hardware and software hybrid configuration of memory channel interleaving management. The memory maps may be configured to present the memory of the memory subsystem in a way that reflects regions in which software memory channel interleaving management may be implemented. The memory maps may map the locations of the memory of the memory subsystem for associated memory channel groups (e.g., memory channel group 408*a*-408*h* in FIG. 4) of one or more of the layers of the memory channel interleaving hierarchy.

In block 808, the memory controller device may enable software memory channel interleaving management for the one or more layers of the memory channel interleaving hierarchy. The memory controller device may select software memory channel interleaving management, from between software and/or hardware memory channel interleaving management, for the one or more layers of the memory channel interleaving hierarchy corresponding with the configuration signal.

Enabling software memory channel interleaving management may be achieved by setting one or more enable values for software memory channel interleaving management and/or one or more disable values for hardware memory channel interleaving management for the one or more layers of the memory channel interleaving hierarchy. The enable and/or disable values may be set, for example, at one or more registers (e.g., memory controller memory 206 in FIG. 2) of the memory controller device. The enable and/or disable values may be configured to indicate to the memory controller devices, such as the processor system and/or a memory channel interleaving integrated circuit system (e.g., memory channel interleaving integrated circuit system 210 in FIG. 2), for which layers of the memory channel interleaving hierarchy to implement software memory channel interleaving management. In some embodiments, the memory controller device enabling software memory channel interleaving management for the one or more layers of the memory channel interleaving hierarchy in block 808 may include the processor, the memory controller, and/or the processor system.

Blocks 810-814 are optional as, in some embodiments, the aspects of one or more of blocks 810-814 may be implemented as corollary to aspects of one or more of blocks 802-808. Regardless, the aspects of one or more of blocks 810-814 may still be implicitly implemented by the memory controller device. However, in some embodiments, the aspects of one or more of blocks 810-814 may be separately implemented from the aspects of one or more of blocks 802-808. In some embodiments, one of more of blocks 810-814 may be implemented in parallel with or serially to one or more of blocks 802-808.

In optional block 810, the memory controller device may read one or more of the signaling mechanisms configured to signal to the memory controller device at least one layer of the memory channel interleaving hierarchy for hardware memory channel interleaving management. The aspects of optional block 810 may be implemented similarly to the aspects of block 802. In some embodiments, the memory controller device reading the one or more of the signaling mechanisms configured to signal to the memory controller device the at least one layer of the memory channel interleaving hierarchy for hardware memory channel interleaving management in optional block 810 may include the processor, the memory controller, and/or the processor system.

The configuration signal may include a value configured to indicate to the memory controller device for which layer of the memory channel interleaving hierarchy to implement software and/or hardware memory channel interleaving management. In some embodiments, the one or more layers of the memory channel interleaving hierarchy for which to implement hardware memory channel interleaving management may be explicit. In some embodiments, the one or more layers of the memory channel interleaving hierarchy for which to implement hardware memory channel interleaving management may be implicit, such as any layers not indicated for software memory channel interleaving management implementation.

In optional block 812, the memory controller device may select the one or more layers of the memory channel interleaving hierarchy for hardware memory channel interleaving management. The aspects of optional block 812 may be implemented similarly to the aspects of block 804. The memory controller device may interpret the one or more configuration signals read from the one or more of the signaling mechanisms. The memory controller device may interpret for which layers of the memory channel interleaving hierarchy the one or more configuration signals indicate to implement hardware memory channel interleaving management. The memory controller device may select from among the layers of the memory channel interleaving hierarchy those layers indicated for hardware memory channel interleaving management by the one or more configuration signals. In some embodiments, the memory controller device selecting the one or more layers of the memory channel interleaving hierarchy for hardware memory channel interleaving management in optional block 812 may include the processor, the memory controller, and/or the processor system.

In optional block 814, enabling hardware memory channel interleaving management using one or more memory channel interleaving integrated circuits (e.g., memory channel interleaving integrated circuit system 210 in FIG. 2) for hardware memory channel interleaving management for the one or more layers of the memory channel interleaving hierarchy. Aspects of optional block 814 may be implemented similarly to the aspects of block 808. The memory controller device may select software and/or hardware memory channel interleaving management for the one or more layers of the memory channel interleaving hierarchy corresponding with the configuration signal. In some embodiments, selecting hardware memory channel interleaving management for the one or more layers of the memory channel interleaving hierarchy corresponding with the configuration signal may be explicit. In some embodiments, selecting hardware memory channel interleaving management for the one or more layers of the memory channel interleaving hierarchy corresponding with the configuration signal may be implicit. For example, selecting hardware memory channel interleaving management for any layers of the memory channel interleaving hierarchy not selected for software memory channel interleaving management.

Enabling software memory channel interleaving management may be achieved by setting one or more enable values for software and/or hardware memory channel interleaving management and/or one or more disable values for software and/or hardware memory channel interleaving management for the one or more layers of the memory channel interleaving hierarchy. The enable and/or disable values may be set, for example, at one or more registers (e.g., memory controller memory 206 in FIG. 2) of the memory controller device. The enable and/or disable values may be configured to indicate to the memory controller devices, such as the processor system and/or the memory channel interleaving integrated circuit system, for which layers of the memory channel interleaving hierarchy to implement software and/or hardware memory channel interleaving management. In some embodiments, setting an enable and/or disable value for hardware memory channel interleaving management may be implicit based on the inverse of the enable and/or disable value for software memory channel interleaving management for the layers of the memory channel interleaving hierarchy. In some embodiments, setting an enable and/or disable value for hardware memory channel interleaving management may be explicit for the layers of the memory channel interleaving hierarchy. In some embodiments, the memory controller device enabling hardware memory channel interleaving management using one or more memory channel interleaving integrated circuits for hardware memory channel interleaving management for the one or more layers of the memory channel interleaving hierarchy in optional block 814 may include the processor, the memory controller, and/or the processor system.

Figure 9:
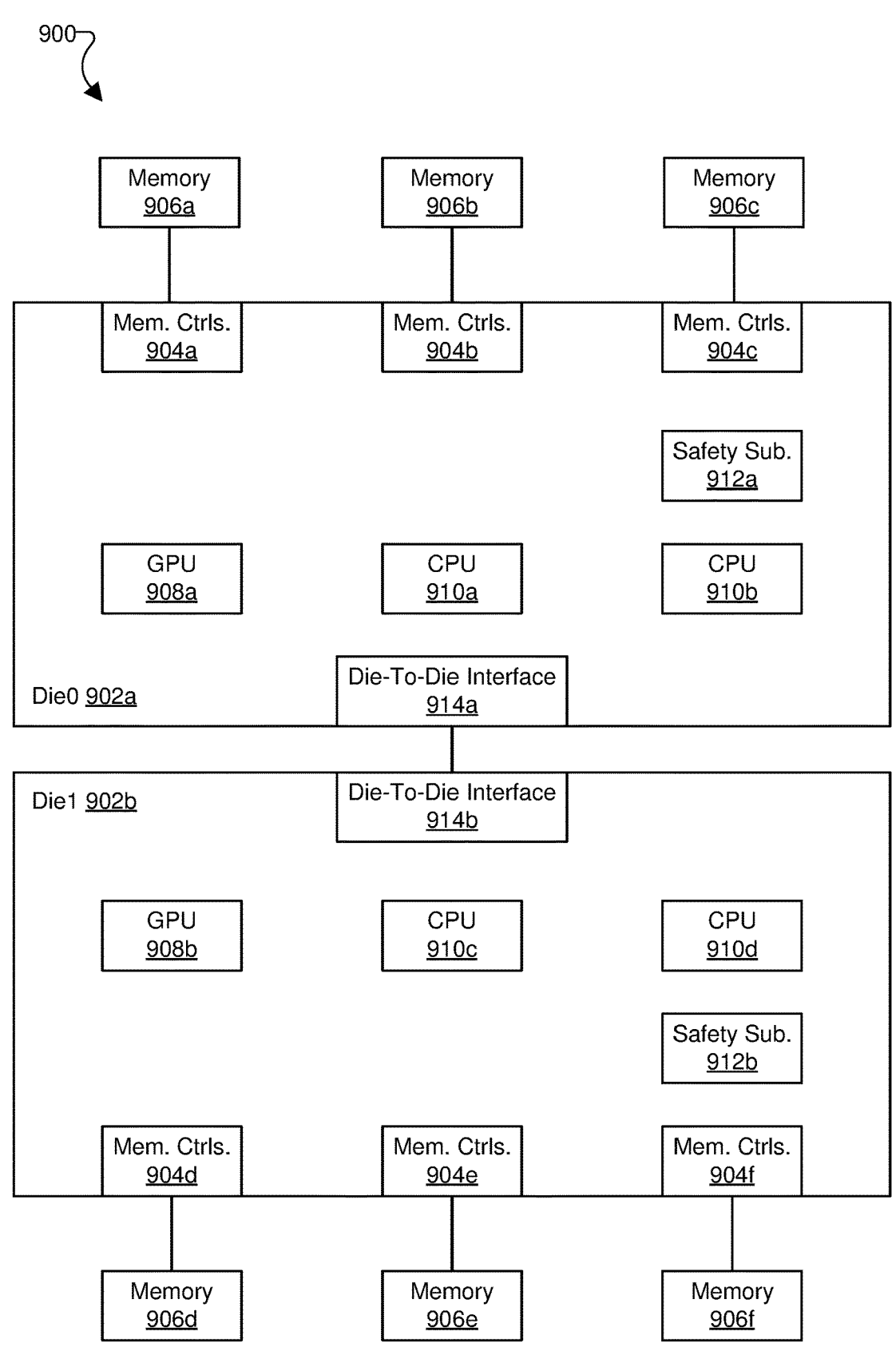
FIG. 9 is a component block diagram illustrating an example computing system of the computing device suitable for implementing various embodiments.
Figure 10:
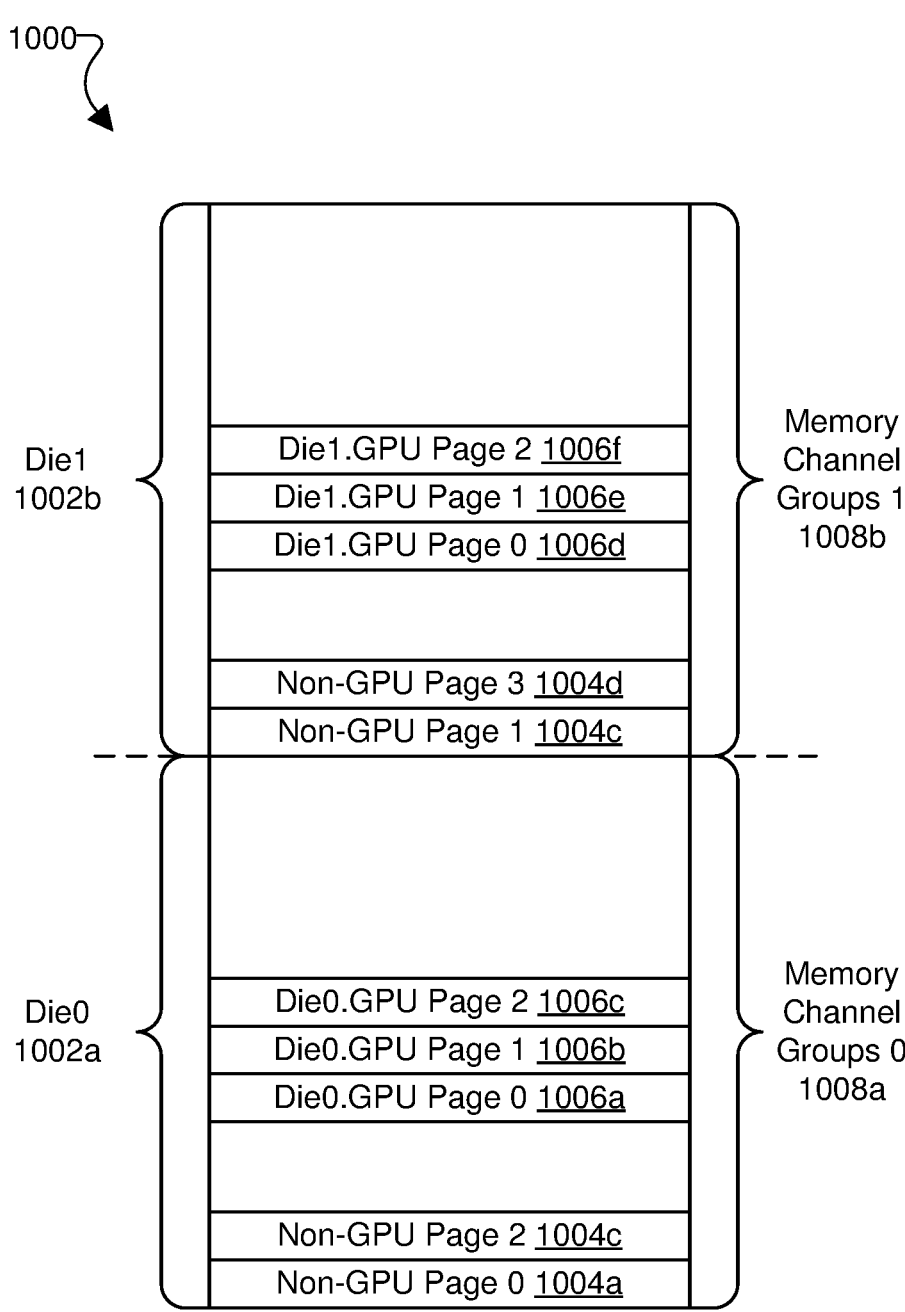
FIG. 10 is a component block diagram illustrating an example of a memory map view of layers of a memory channel interleaving hierarchy of a memory subsystem of the computing device suitable for implementing various embodiments.
Figure 11:
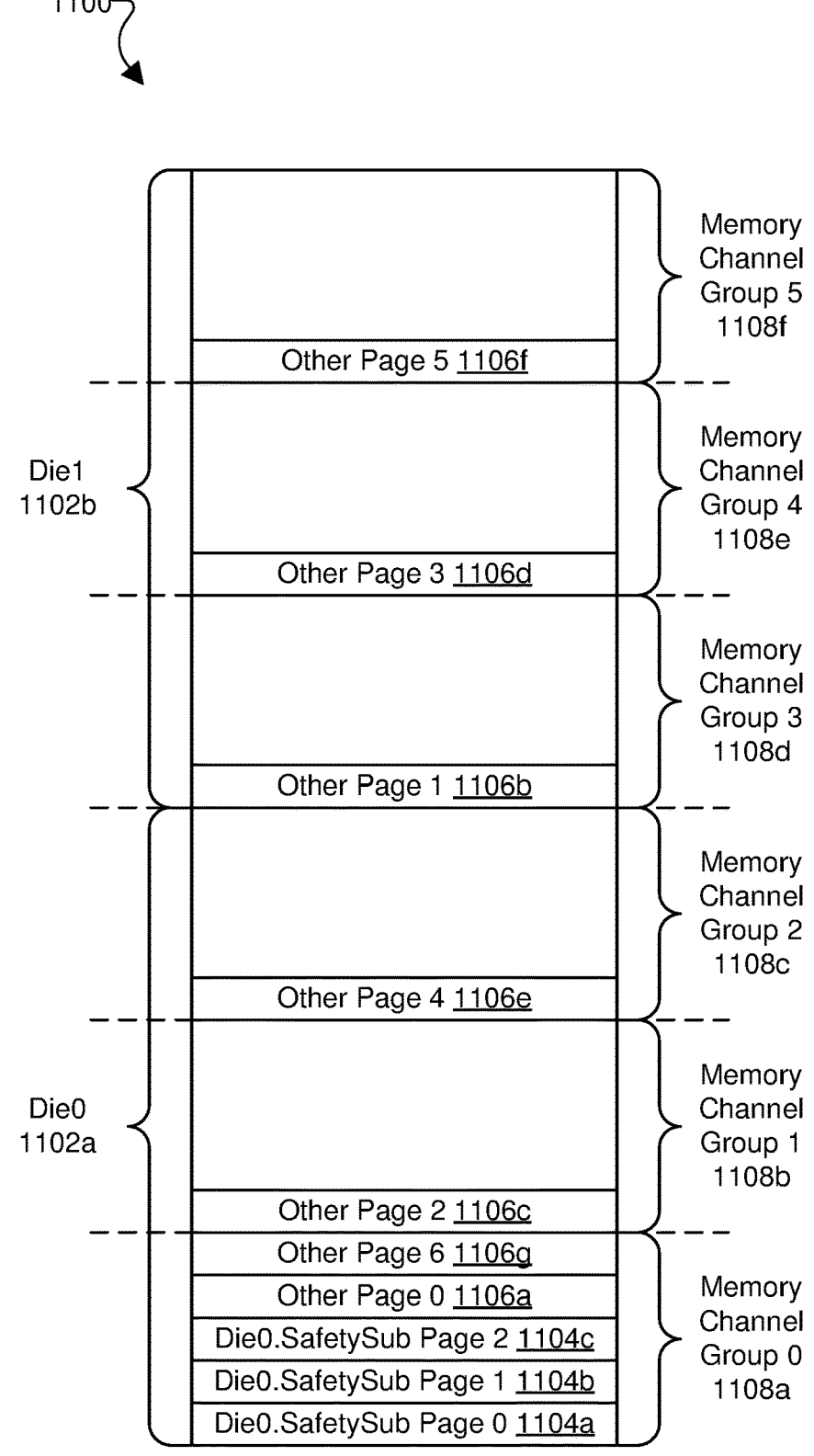
FIG. 11 is a component block diagram illustrating an example of a memory map view of layers of a memory channel interleaving hierarchy of a memory subsystem of the computing device suitable for implementing various embodiments.

FIG. 9 illustrates an example of a computing system 900 (e.g., computing system 400, 500a-500c in FIGS. 4-5C) of the computing device (e.g., computing device 10 in FIG. 1) suitable for implementing various embodiments. FIGS. 10 and 11 illustrate examples of a memory map view (e.g., memory map 600a-600c in FIGS. 6A-6C) of layers (e.g., layer 508, 510, 512 in FIGS. 5A-5C) of the memory channel interleaving hierarchy of a memory subsystem (e.g., memory subsystem 300 in FIG. 3) of the computing system suitable for implementing various embodiments. With reference to FIGS. 1-9, the computing system 900 may include multiple dies 902a, 902b (e.g., SoC 12 in FIG. 1, die 402a-402d, 502a, 502b in FIGS. 4-5C) connected via a die-to-die interface 914a, 914b. The dies 902a, 902b may include various processor systems (e.g., processor 14 in FIG. 1), such as a GPU 908a, 908b, a CPU 910a, 910b, 910c, 910d, and/or a safety subsystem 912a, 912b (safety sub. in FIG. 9). The dies 902a may also have the memory subsystem, including multiple memory controllers 904a, 904b, 904c, 904d, 904e, 904f ("mem. ctrls." in FIG. 9) (e.g., memory interface 34 in FIG. 1, memory controller 200, 302a, 302b, 404a-404h, 504a-504d in FIGS. 2-5C) each connected to a memory 906a, 906b, 906c, 906d, 906e, 906f (e.g., memory 36, 310, 406a-406h, 506a-506d in FIGS. 1 and 3-5C, memory modules 304a, 304b, 304c, 304d, portion of the memory 306a, 306b in FIG. 3).

In a non-limiting example, each memory controller 904a-904f may include 4 individual memory controllers each connected to an individual memory of a respective one of the memory 906a-906f. The connections between the memory controllers 904a-904f and the memories 906a-906f may include 24 memory channels split into 6 memory channel groups of 4 memory channels each for the computing system 900. Therefore, each die 902a, 902b may have 12 memory channels split into 3 memory channel groups of 4 memory channels each. A memory channel group may correspond with a memory controller 904a-904f in FIG. 9.

In the example illustrated in FIG. 10, the memory controllers 904a-904f may be configured for software memory channel interleaving management for the inter-die memory channel group layer (e.g., inter-die memory channel group layer 512 in FIG. 5C) of the memory channel interleaving hierarchy. The memory controllers 904a-904f may be configured for hardware memory channel interleaving management for the intra-memory channel group layer (e.g., intra-memory channel group layer 508 in FIG. 5A) and the inter-memory channel group layer (e.g., inter-memory channel group layer 510 in FIG. 5B) of the memory channel interleaving hierarchy. The CPUs 910a-910d and the safety subsystems 912a, 912b may have buffers allocated across the memory channel groups. The GPUs 908a, 908b may have localized buffers. Non-GPU traffic may be spread across the memory channel groups.

The memory channel groups 1008a (e.g., memory channel groups 0 in FIG. 10) of the die 902a (die0 in FIG. 9) and the memory controllers 904a-904c may map to the die0 region 1002a of the memory map 1000. The memory channel groups 1008b (e.g., memory channel groups 1 in FIG. 10) of the die 902b (die1 in FIG. 9) and the memory controllers 904d-904f may map to the die1 region 1002b of the memory map 1000. Non-GPU pages 1004a, 1004b, 1004c, 1004d may be allocated to the different die regions 1002a, 1002b of the memory map 1000. The GPU pages 1006a, 1006b, 1006c, 1006d, 1006e, 1006f for the GPUs 908a, 908b of the respective dies 902a, 902b may be mapped to the die region 1002a, 1002b of the respective die 902a, 902b for each GPU 908a, 908b. The memory controllers 904a-904f may be configured for software memory channel interleaving management for the inter-die memory channel group interleaving layer, such as for the non-GPU pages 1004a-1004d. The memory controllers 904a-904f may be configured for hardware memory channel interleaving management for the intra-memory channel group interleaving layer and the inter-memory channel group interleaving layer, which may include the remaining memory space of the memory map 1000.

In the example illustrated in FIG. 11, the memory controllers 904a-904f may be configured for software memory channel interleaving management for the inter-memory channel group layer (e.g., inter-memory channel group layer 510 in FIG. 5B) and the inter-die memory channel group layer (e.g., inter-die memory channel group layer 512 in FIG. 5C) of the memory channel interleaving hierarchy. The memory controllers 904a-904f may be configured for hardware memory channel interleaving management for the intra-memory channel group layer (e.g., intra-memory channel group layer 508 in FIG. 5A) of the memory channel interleaving hierarchy. The GPUs 908a, 908b, CPUs 910a-910d, and the safety subsystem 912b may have buffers allocated across the memory channel groups. The safety subsystem 912a may have localized buffers. Traffic of the GPUs 908a, 908b, CPUs 910a-910d, and the safety subsystem 912b may be spread across the memory channel groups.

The memory channel groups 1108a, 1108b, 1108c (e.g., memory channel group 0, memory channel group 1, memory channel group 2 in FIG. 11) of the die 902a (die0 in FIG. 9) and the memory controllers 904a-904c may map to the die0 region 1102a of the memory map 1100. The memory channel groups 1108d, 1108e, 1108f (e.g., memory channel group 3, memory channel group 4, memory channel group 5 in FIG. 11) of the die 902b (die1 in FIG. 9) and the memory controllers 904d-904f may map to the die1 region 1102b of the memory map 1100. Safety subsystem pages 1104a, 1104b, 1104c of the safety subsystem 912a of die 902a may be mapped to the die0 region 1102a. Other pages 1106a, 1106b, 1106c, 1106d, 1106e, 1106f, 1106g may be allocated to the different die regions 1102a, 1102b of the memory map 1100. The memory controllers 904a-904f may be configured for software memory channel interleaving management for the inter-memory channel group interleaving layer and the inter-die memory channel group interleaving layer, such as for the other pages 1106a-1106g. The memory controllers 904a-904f may be configured for hardware memory channel interleaving management for the intra-memory channel group interleaving layer, which may include the remaining memory space of the memory map 1100.

Figure 12:
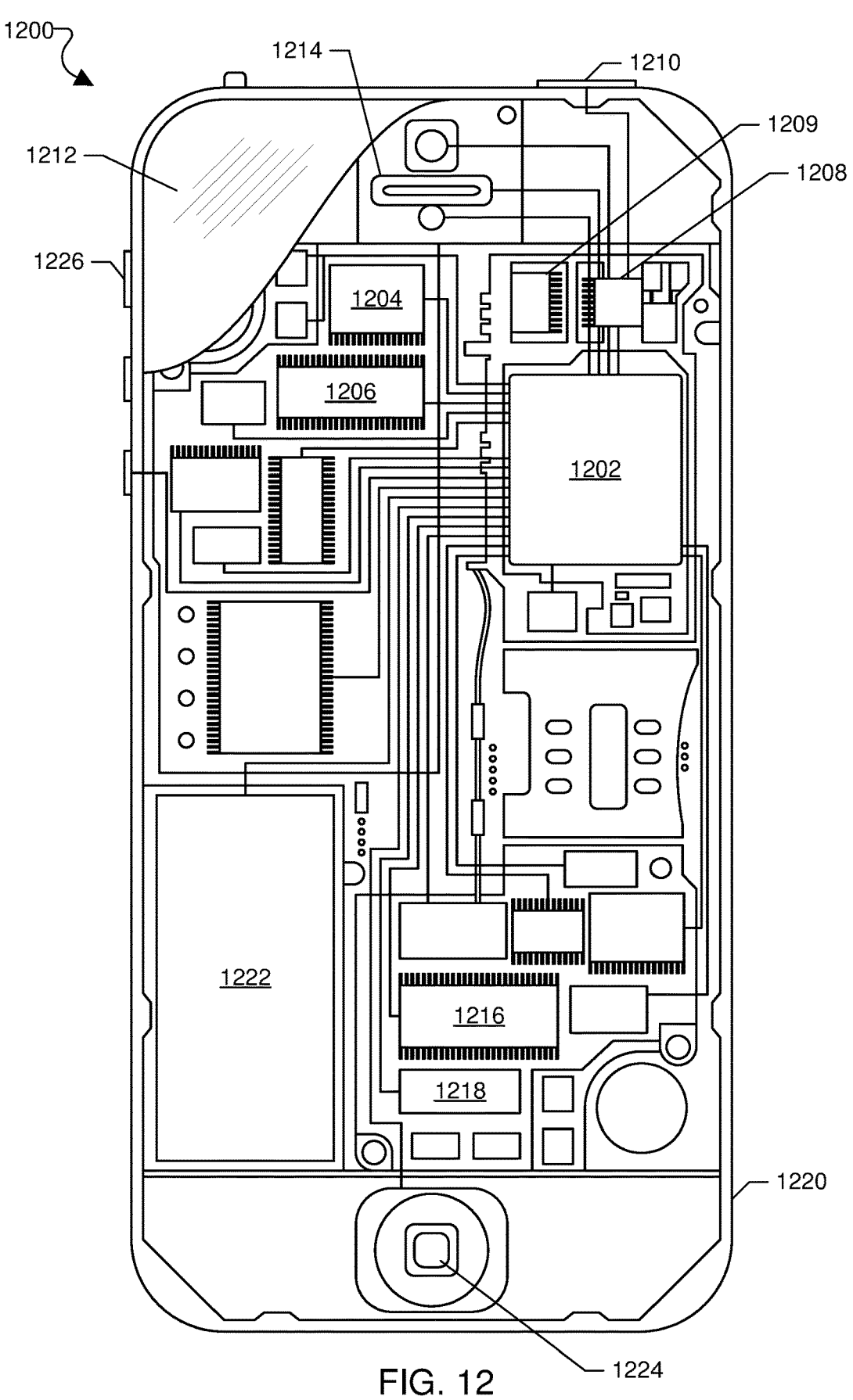
FIG. 12 is a component block diagram illustrating an example mobile computing device suitable for implementing various embodiments.

A system in accordance with the various embodiments (including, but not limited to, embodiments described above with reference to FIGS. 1-11) may be implemented in a wide variety of computing systems including mobile computing devices, an example of which suitable for use with the various embodiments is illustrated in FIG. 12. The mobile computing device 1200 may include a processor 1202 coupled to a touchscreen controller 1204 and an internal memory 1206. The processor 1202 may be one or more multicore integrated circuits designated for general or specific processing tasks. The internal memory 1206 may be volatile or non-volatile memory, and may also be secure and/or encrypted memory, unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the mobile computing device 1200 need not have touch screen capability.

The mobile computing device 1200 may have one or more radio signal transceivers 1208 (e.g., Peanut, Bluetooth, ZigBee, Wi-Fi, RF radio) and antennae 1210, for sending and receiving communications, coupled to each other and/or to the processor 1202. The processor 1202 may also be coupled to a cellular network wireless modem 1209 that enables communication via a cellular network (e.g., a 5G network) via the antenna 1210. The transceivers 1208 and antennae 1210 may be used with the above-mentioned circuitry to implement the various wireless transmission protocol stacks and interfaces.

The mobile computing device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as Universal Serial Bus (USB), FireWire, Thunderbolt, or PCIe. The peripheral device connection interface 1218 may also be coupled to a similarly configured peripheral device connection port (not shown).

The mobile computing device 1200 may also include speakers 1214 for providing audio outputs. The mobile computing device 1200 may also include a housing 1220, constructed of a plastic, metal, or a combination of materials, for containing all or some of the components described herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

Figure 13:
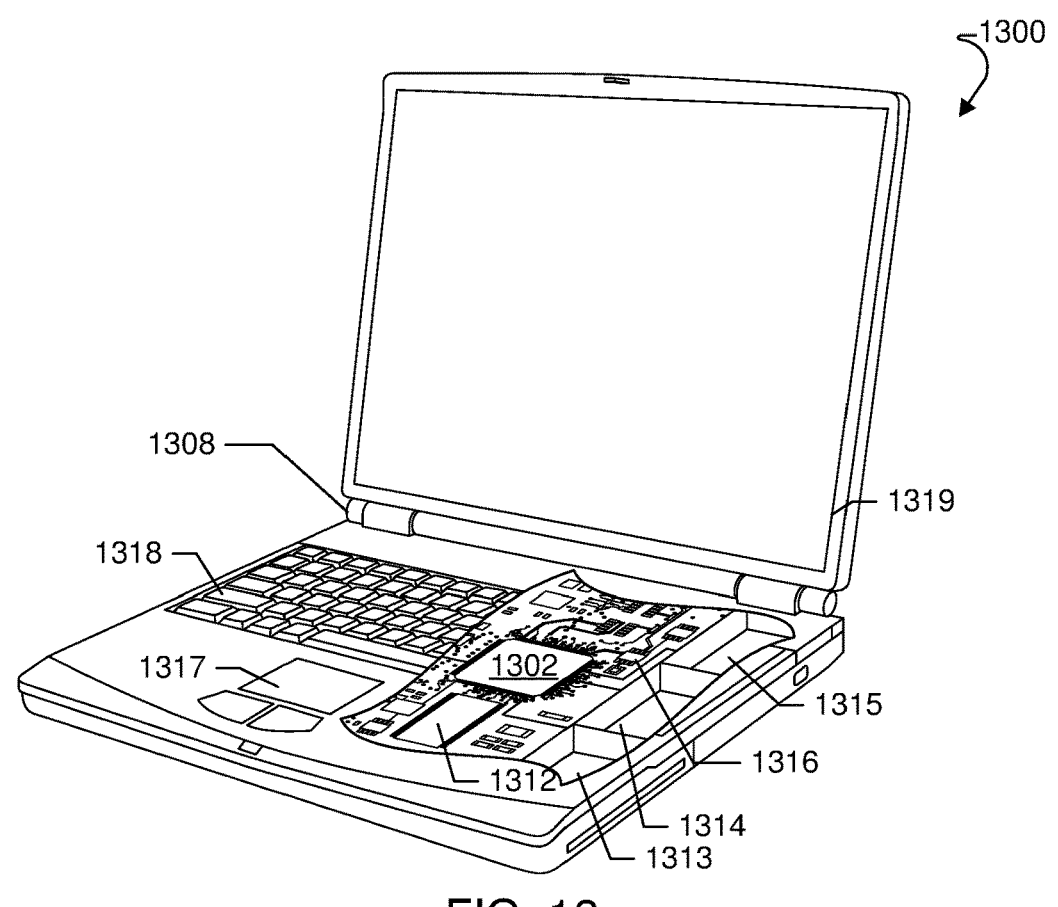
FIG. 13 is a component block diagram illustrating an example mobile computing device suitable for implementing various embodiments.

A system in accordance with the various embodiments (including, but not limited to, embodiments described above with reference to FIGS. 1-11) may be implemented in a wide variety of computing systems including a laptop computer 1300, an example of which is illustrated in FIG. 13. Many laptop computers include a touchpad touch surface 1317 that serves as the computer's pointing device, and thus may receive drag, scroll, and flick gestures similar to those implemented on computing devices equipped with a touch screen display and described above. A laptop computer 1300 will typically include a processor 1302 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1302. The computer 1300 may also include a floppy disc drive 1314 and a compact disc (CD) drive 1315 coupled to the processor 1302. In a notebook configuration, the computer housing includes the touchpad 1317, the keyboard 1318, and the display 1319 all coupled to the processor 1302. Other configurations of the computing device may include a computer mouse or trackball coupled to the processor (e.g., via a USB input) as are well known, which may also be used in conjunction with the various embodiments.

Figure 14:
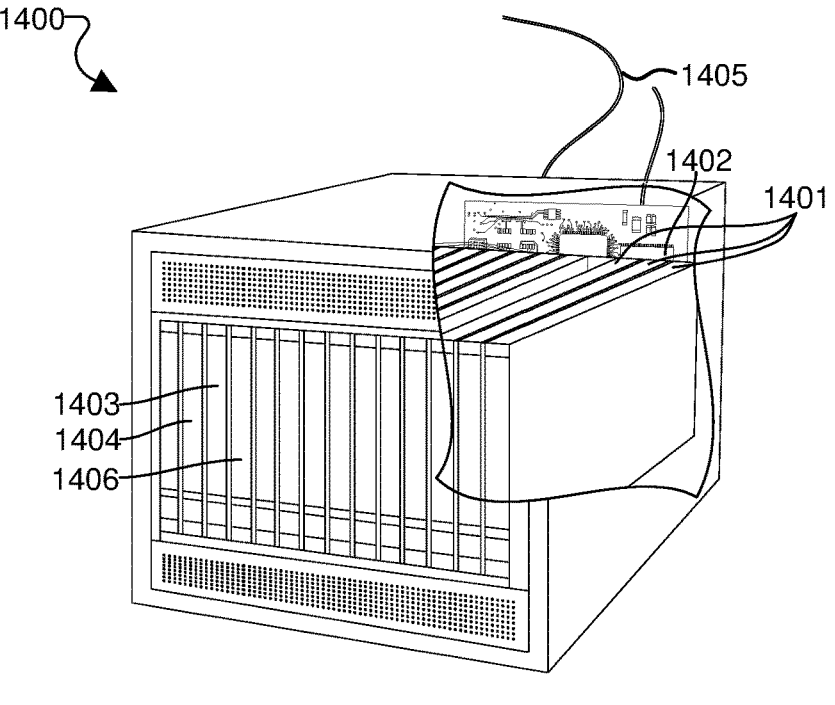
FIG. 14 is a component block diagram illustrating an example server suitable for implementing various embodiments.

A system in accordance with the various embodiments (including, but not limited to, embodiments described above with reference to FIGS. 1-11) may also be implemented in fixed computing systems, such as any of a variety of commercially available servers. An example server 1400 is illustrated in FIG. 14. Such a server 1400 typically includes one or more multicore processor assemblies 1401 coupled to volatile memory 1402 and a large capacity nonvolatile memory, such as a disk drive 1404. As illustrated in FIG. 14, multicore processor assemblies 1401 may be added to the server 1400 by inserting them into the racks of the assembly. The server 1400 may also include a floppy disc drive, compact disc (CD) or digital versatile disc (DVD) disc drive 1406 coupled to the processor 1401. The server 1400 may also include network access ports 1403 coupled to the multicore processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Figure 15A:
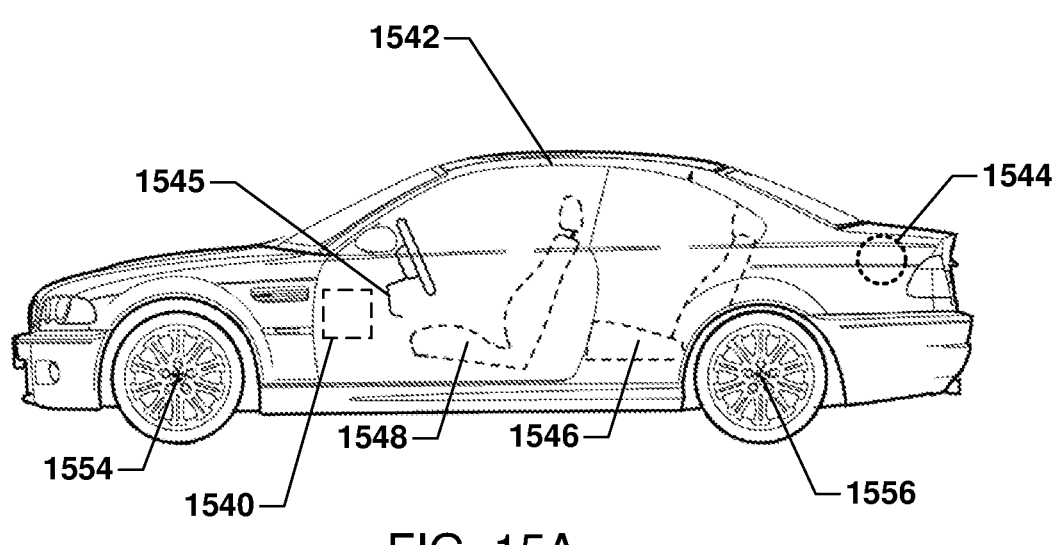
FIGS. 15A-15C are component block diagrams illustrating an example embedded vehicle computing system suitable for implementing various embodiments.
Figure 15B:
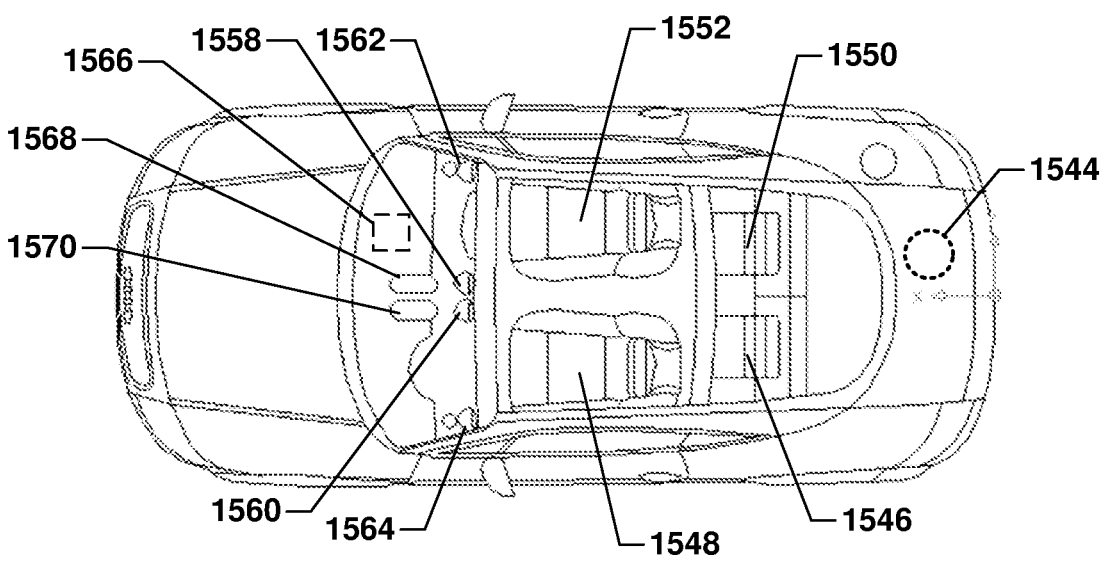
Figure 15C:
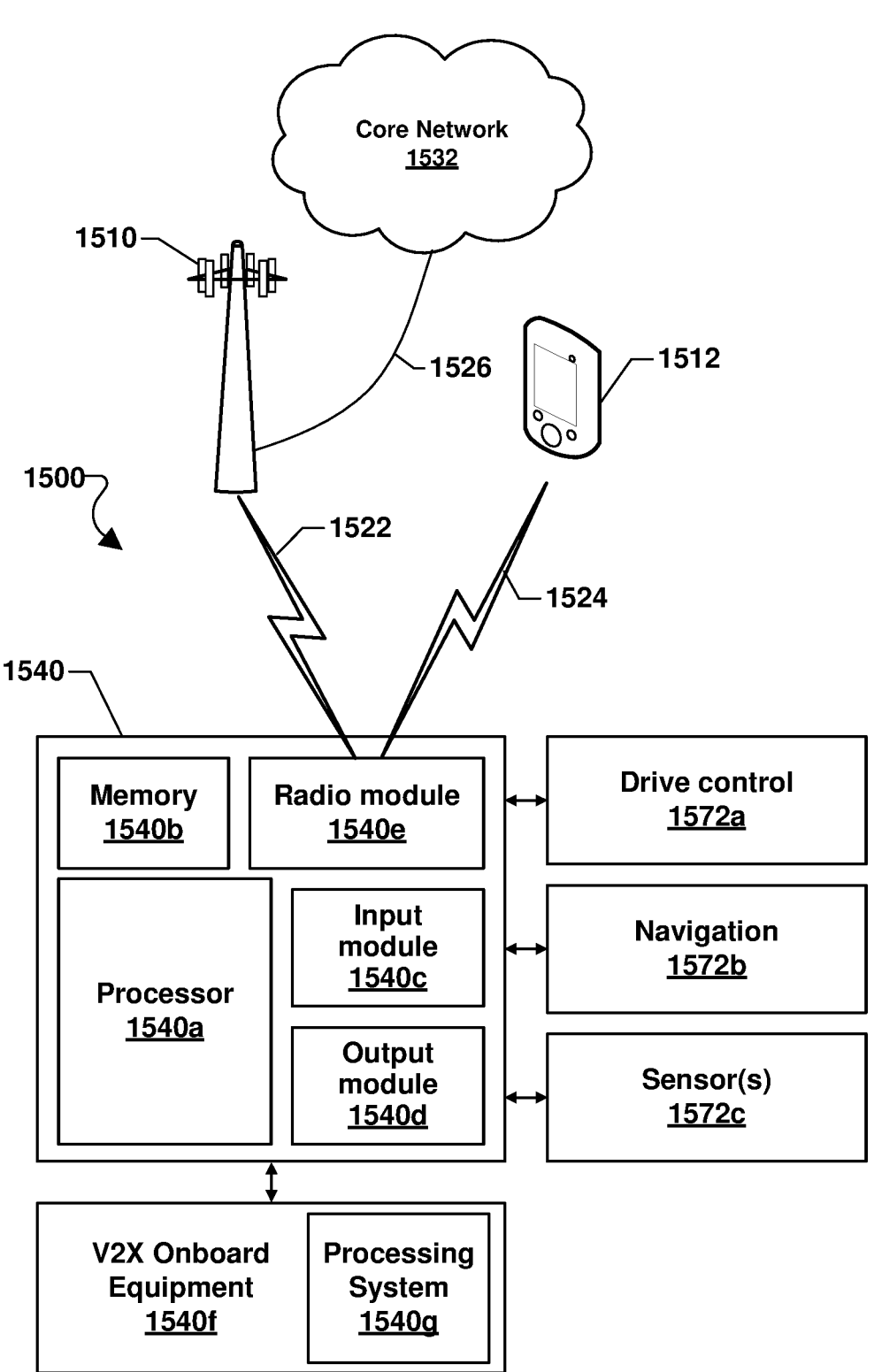

Methods and devices for implementing such methods in accordance with the various embodiments (including, but not limited to, embodiments described above with reference to FIGS. 1-11) may be implemented in a wide variety of computing systems including an embedded vehicle computing system 1500 an example of which is illustrated in FIGS. 15A-15C. An embedded vehicle computing system 1500 may include a vehicle control unit 1540, such as an ECU, which may include a processor, such as a CPU, an artificial intelligence (AI) processor, etc. The embedded vehicle computing system 1500 may include a plurality of sensors 1542-1570, including Global Navigation Satellite System (GNSS) receivers 1542, accelerometers 1544, occupancy sensors 1546, 1548, 1550, 1552, tire pressure sensors 1554, 1556, cameras 1558, 1560, microphones 1562, 1564, impact sensors 1566, external sensors 1568, 1570.

The plurality of sensors 1542-1570, disposed in or on the vehicle, may be used for various purposes, such as navigation, crash avoidance, etc., as well to provide sensor data regarding objects and people in or on the vehicle. The sensors 1542-1570 may include one or more of a wide variety of sensors capable of detecting a variety of information useful for navigation and collision avoidance. Each of the sensors 1542-1570 may be in wired or wireless communication with a control unit 1540, as well as with each other. In particular, the sensors may include one or more cameras 1558, 1560 or other optical sensors or photo optic sensors. The sensors may further include other types of object detection and ranging sensors, such as external sensors 1568, 1570, IR sensors, and ultrasonic sensors. The sensors may further include tire pressure sensors 1554, 1556, humidity sensors, temperature sensors, satellite GNSS receivers 1542, control input sensors 1545, accelerometers 1544, vibration sensors, gyroscopes, gravimeters, impact sensors 1566, force meters, stress meters, strain sensors, fluid sensors, chemical sensors, gas content analyzers, pH sensors, radiation sensors, Geiger counters, neutron detectors, biological material sensors, microphones 1562, 1564, occupancy sensors 1546, 1548, 1550, 1552, proximity sensors, and other sensors.

The vehicle control unit 1540 may include one or more processors configured with processor-executable instructions to perform navigation and collision avoidance operations using information received from various sensors, particularly the cameras 1558, 1560. In some embodiments, the control unit 1540 may supplement the processing of camera images using distance and relative position (e.g., relative bearing angle) that may be obtained from external sensors 1568, 1570. The control unit 1540 may further be configured to control steering, braking and speed of the vehicle using information regarding other vehicles determined using various embodiments. The vehicle control unit 1540 may include one or more processors configured with processor-executable instructions to receive information from the sensors 1542-1570 and to perform operations using such information as further described herein. In various embodiments, the vehicle control unit 1540 may include, be a component of, or communicate with V2X onboard equipment of the vehicle.

FIG. 15C is a component block diagram illustrating the embedded vehicle computing system 1500 including components and support systems suitable for implementing various embodiments. The embedded vehicle computing system 1500 may include the control unit 1540, which may include various circuits and devices used to control the operation of the vehicle. The control unit 1540 may include a processor 1540a, such as a CPU, an AI processor, etc., a memory 1540b, an input module 1540c, an output module 1540d, and a radio module 1540e. The control unit 1540 may be coupled to and configured to control drive control components 1572a, navigation components 1572b, and one or more sensors 1572c of the embedded vehicle computing system 1500. The control unit 1540 may communicate with V2X onboard equipment 1540f. The processor 1540a may be configured with processor-executable instructions to control maneuvering, navigation, and/or other operations of the vehicle, including operations of various embodiments, including gathering and analyzing real-world vehicle run data gathered from the sensors 1572c. The processor 1540a may be coupled to the memory 1540b. The V2X onboard equipment 1540f may include one or more processors 1540g configured with processor-executable instructions to perform various operations of various embodiments, including communicating real-world vehicle run data gathered from the sensors 1572c between the embedded vehicle computing system 1540 and a wireless communication device 1512 and/or the computing device on a communication network (e.g., a core network 1532) via the radio module 1540e.

The radio module 1540e may be configured for wireless communication. The radio module 1540e may exchange signals (e.g., command signals for controlling maneuvering, signals from navigation facilities, data signals, etc.) via a communication link 1522 with a network transceiver (e.g., the base station 1510), and may provide the signals to the processor 1540a, 1540g and/or the navigation unit 1572b. In some embodiments, the radio module 1540e may enable the embedded vehicle computing system 1500 to communicate with a wireless communication device 1512 through the wireless communication link 1524. The wireless communication link 1524 may be a bidirectional or unidirectional communication link and may use one or more communication protocols.

The input module 1540c may receive sensor data from one or more vehicle sensors 1572c as well as electronic signals from other components, including the drive control components 1572a and the navigation components 1572b. The output module 1540d may communicate with or activate various components of the embedded vehicle computing system 1500, including the drive control components 1572a, the navigation components 1572b, and the sensor(s) 1572c.

The control unit 1540 may be coupled to the drive control components 1572a to control physical elements of the vehicle related to maneuvering and navigation of the vehicle, such as the engine, motors, throttles, steering elements, flight control elements, braking or deceleration elements, and the like. The drive control components 1572a may also include components that control other devices of the vehicle, including interior environment controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 1540 may be coupled to the navigation components 1572b, and may receive data from the navigation components 1572b and be configured to use such data to determine the present position and orientation of the vehicle, as well as an appropriate course toward a destination. The navigation components 1572b may include or be coupled to a GNSS receiver system (e.g., one or more Global Positioning System (GPS) receivers) enabling the embedded vehicle computing system 1500 to determine its current position using GNSS signals. Alternatively, or in addition, the navigation components 1572b may include radio navigation receivers for receiving navigation beacons or other signals from radio nodes, such as Wi-Fi access points, cellular network sites, radio station, remote computing devices, other vehicles, etc. Through control of the drive control elements 1572a, the processor 1540a may control the vehicle to navigate and maneuver. The processor 1540a, 1540g and/or the navigation components 1572b may be configured to communicate with a network element such as a server in a communication network (e.g., a core network 1532) via the wireless communication link 1522, 1526 to receive commands to control maneuvering, receive data useful in navigation, provide real-time position reports, etc.

The control unit 1540 may be coupled to one or more sensors 1572c. The sensor(s) 1572c may include the sensors 1542-1570 as described, and may be configured to provide a variety of data to the processor 1540a, 1540g.

While the control unit 1540 is described as including separate components, in some embodiments some or all of the components (e.g., the processor 1540a, the memory 1540b, the input module 1540c, the output module 1540d, and the radio module 1540e) may be integrated in a single device or module, such as an SoC processing device. Such an SoC processing device may be configured for use in vehicles and be configured, such as with processor-executable instructions executing in the processor 1540a, to perform operations of navigation and collision avoidance.

Implementation examples are described in the following paragraphs. While some of the following implementation examples are described in terms of example systems, devices, or methods, further example implementations may include the example systems or devices discussed in the following paragraphs implemented as a non-transitory processor-readable storage medium having stored thereon processor-executable instructions configured to cause a processor of a computing device to perform the operations of the example systems, devices, or methods.

Example 1. A memory subsystem for a computing device, including: at least one memory controller including: at least one signaling mechanism configured to provide at least one configuration signal for indicating to the memory controller at least one layer of a memory channel interleaving hierarchy for software memory channel interleaving management; at least one processor configured to: read the at least one configuration signal; and select the at least one layer of the memory channel interleaving hierarchy for software memory channel interleaving management based on the at least one configuration signal; and at least one integrated circuit configured to implement memory channel interleaving according to at least one layer of the memory channel interleaving hierarchy for hardware memory channel interleaving management concurrently with software memory channel interleaving management by the at least one processor.

Example 2. The memory subsystem of example 1, in which: the at least one layer of the memory channel interleaving hierarchy for software memory channel interleaving management includes at least one of an intra-memory channel group layer, an inter-memory channel group layer, or an inter-die memory channel group layer; and the at least one layer of the memory channel interleaving hierarchy for hardware memory channel interleaving management includes at least one of the intra-memory channel group layer, the inter-memory channel group layer, or the inter-die memory channel group layer that is different from the at least one layer of the memory channel interleaving hierarchy for software memory channel interleaving management.

Example 3. The memory subsystem of either of examples 1 or 2, in which the at least one processor is further configured to load at least one memory map corresponding to the at least one layer of the memory channel interleaving hierarchy for software memory channel interleaving management.

Example 4. The memory subsystem of any of examples 1-3, in which the at least one processor is further configured to implement memory channel interleaving according to the at least one layer of the memory channel interleaving hierarchy for software memory channel interleaving management.

Example 5. The memory subsystem of any of examples 1-, in which: the at least one processor is further configured to implement the memory channel interleaving across a plurality of memory channels of at least one memory channel group of the at least one layer of the memory channel interleaving hierarchy for software memory channel interleaving management; and the at least one integrated circuit is further configured to implement the memory channel interleaving across a plurality of memory channels of at least one memory channel group of the at least one layer of the memory channel interleaving hierarchy for hardware memory channel interleaving management.

Example 6. The memory subsystem of any of examples 1-, in which: the at least one configuration signal is further configured to indicate to the memory controller the at least one layer of the memory channel interleaving hierarchy for hardware memory channel interleaving management; and the at least one processor is further configured to select the at least one integrated circuit configured to implement memory channel interleaving according to the at least one layer of the memory channel interleaving hierarchy for hardware memory channel interleaving management based on the at least one configuration signal.

Example 7. The memory subsystem of any of examples 1-, in which the least one signaling mechanism includes at least one of a register, an electronic fuse, or a pin.

Example 8. A memory subsystem for a computing device, may include: at least one memory controller that may include: at least one signaling mechanism configured to provide at least one configuration signal for indicating to the memory controller at least one layer of a memory channel interleaving hierarchy for software memory channel interleaving management; at least one processor configured to: read the at least one configuration signal; and select the at least one layer of the memory channel interleaving hierarchy for software memory channel interleaving management based on the at least one configuration signal; and at least one integrated circuit configured to implement memory channel interleaving according to at least one layer of the memory channel interleaving hierarchy for hardware memory channel interleaving management concurrently with software memory channel interleaving management by the at least one processor.

Example 9. The memory subsystem of example 8, in which: the at least one layer of the memory channel interleaving hierarchy for software memory channel interleaving management may include at least one of an intra-memory channel group layer, an inter-memory channel group layer, or an inter-die memory channel group layer; and the at least one layer of the memory channel interleaving hierarchy for hardware memory channel interleaving management may include at least one of the intra-memory channel group layer, the inter-memory channel group layer, or the inter-die memory channel group layer that is different from the at least one layer of the memory channel interleaving hierarchy for software memory channel interleaving management.

Example 10. The memory subsystem of either of examples 8 or 9, in which the at least one processor may be further configured to load at least one memory map corresponding to the at least one layer of the memory channel interleaving hierarchy for software memory channel interleaving management.

Example 11. The memory subsystem of any of examples 8-10, in which the at least one processor may be further configured to implement memory channel interleaving according to the at least one layer of the memory channel interleaving hierarchy for software memory channel interleaving management.

Example 12. The memory subsystem of any of examples 8-11, in which the at least one processor may be further configured to implement the memory channel interleaving across a plurality of memory channels of at least one memory channel group of the at least one layer of the memory channel interleaving hierarchy for software memory channel interleaving management; and the at least one integrated circuit may be further configured to implement the memory channel interleaving across a plurality of memory channels of at least one memory channel group of the at least one layer of the memory channel interleaving hierarchy for hardware memory channel interleaving management.

Example 13. The memory subsystem of any of examples 8-12, in which the at least one configuration signal may be further configured to indicate to the memory controller the at least one layer of the memory channel interleaving hierarchy for hardware memory channel interleaving management; and the at least one processor may be further configured to select the at least one integrated circuit configured to implement memory channel interleaving according to the at least one layer of the memory channel interleaving hierarchy for hardware memory channel interleaving management based on the at least one configuration signal.

Example 14. The memory subsystem of any of example 8-13, in which the least one signaling mechanism may include at least one of a register, an electronic fuse, or a pin.

Example 15. A computing device, including: means for reading at least one configuration signal for indicating at least one layer of a memory channel interleaving hierarchy for software memory channel interleaving management; means for selecting the at least one layer of the memory channel interleaving hierarchy for software memory channel interleaving management based on the at least one configuration signal; and means for implementing memory channel interleaving according to at least one layer of the memory channel interleaving hierarchy for hardware memory channel interleaving management concurrently with means for implementing software memory channel interleaving management.

Example 16. The computing device of example 15, in which: the at least one layer of the memory channel interleaving hierarchy for software memory channel interleaving management includes at least one of an intra-memory channel group layer, an inter-memory channel group layer, or an inter-die memory channel group layer; and the at least one layer of the memory channel interleaving hierarchy for hardware memory channel interleaving management includes at least one of the intra-memory channel group layer, the inter-memory channel group layer, or the inter-die memory channel group layer that is different from the at least one layer of the memory channel interleaving hierarchy for software memory channel interleaving management.

Example 17. The computing device of either of examples 15 or 16, further including means for loading at least one memory map corresponding to the at least one layer of the memory channel interleaving hierarchy for software memory channel interleaving management.

Example 18. The computing device of any of examples 15-17, in which means for implementing software memory channel interleaving management includes means for implementing memory channel interleaving according to the at least one layer of the memory channel interleaving hierarchy for software memory channel interleaving management.

Example 19. The computing device of any of examples 15-18, in which: means for implementing the memory channel interleaving according to the at least one layer of the memory channel interleaving hierarchy for hardware memory channel interleaving management includes means for implementing the memory channel interleaving across a plurality of memory channels of at least one memory channel group of the at least one layer of the memory channel interleaving hierarchy for hardware memory channel interleaving management; and in which means for implementing software memory channel interleaving management includes means for implementing the memory channel interleaving across a plurality of memory channels of at least one memory channel group of the at least one layer of the memory channel interleaving hierarchy for software memory channel interleaving management.

Example 20. The computing device of any of examples 15-19, in which the at least one configuration signal is further configured to indicate the at least one layer of the memory channel interleaving hierarchy for hardware memory channel interleaving management, the computing device further including means for selecting the means for implementing memory channel interleaving according to the at least one layer of the memory channel interleaving hierarchy for hardware memory channel interleaving management based on the at least one configuration signal.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A memory subsystem for a computing device, comprising:

at least one memory controller comprising:

at least one signaling mechanism configured to provide at least one configuration signal for indicating to the memory controller at least one layer of a memory channel interleaving hierarchy for software memory channel interleaving management;

at least one processor configured to:

read the at least one configuration signal;

select the at least one layer of the memory channel interleaving hierarchy for software memory channel interleaving management based on the at least one configuration signal; and load at least one memory map corresponding to the at least one layer of the memory channel interleaving hierarchy for software memory channel interleaving management, wherein the at least one memory map is configured to present a view of memory of the memory subsystem; and at least one integrated circuit configured to implement memory channel interleaving according to at least one layer of the memory channel interleaving hierarchy for hardware memory channel interleaving management concurrently with software memory channel interleaving management by the at least one processor.

2. The memory subsystem of claim 1, wherein:

the at least one layer of the memory channel interleaving hierarchy for software memory channel interleaving management comprises at least one of an intra-memory channel group layer, an inter-memory channel group layer, or an inter-die memory channel group layer; and the at least one layer of the memory channel interleaving hierarchy for hardware memory channel interleaving management comprises at least one of the intra-memory channel group layer, the inter-memory channel group layer, or the inter-die memory channel group layer that is different from the at least one layer of the memory channel interleaving hierarchy for software memory channel interleaving management.

3. The memory subsystem of claim 1, wherein the at least one processor is further configured to implement memory channel interleaving according to the at least one layer of the memory channel interleaving hierarchy for software memory channel interleaving management.

4. The memory subsystem of claim 1, wherein:

the at least one processor is further configured to implement the memory channel interleaving across a plurality of memory channels of at least one memory channel group of the at least one layer of the memory channel interleaving hierarchy for software memory channel interleaving management; and the at least one integrated circuit is further configured to implement the memory channel interleaving across a plurality of memory channels of at least one memory channel group of the at least one layer of the memory channel interleaving hierarchy for hardware memory channel interleaving management.

5. The memory subsystem of claim 1, wherein:

the at least one configuration signal is further configured to indicate to the memory controller the at least one layer of the memory channel interleaving hierarchy for hardware memory channel interleaving management; and the at least one processor is further configured to select the at least one integrated circuit configured to implement memory channel interleaving according to the at least one layer of the memory channel interleaving hierarchy for hardware memory channel interleaving management based on the at least one configuration signal.

6. The memory subsystem of claim 1, wherein the least one signaling mechanism comprises at least one of a register, an electronic fuse, or a pin.

7. A method for configuration of memory channel interleaving management implemented by a memory controller, comprising:

reading at least one configuration signal for indicating to the memory controller at least one layer of a memory channel interleaving hierarchy for software memory channel interleaving management;

selecting the at least one layer of the memory channel interleaving hierarchy for software memory channel interleaving management based on the at least one configuration signal;

implementing, by at least one integrated circuit, memory channel interleaving according to at least one layer of the memory channel interleaving hierarchy for hardware memory channel interleaving management concurrently with software memory channel interleaving management by the memory controller; and loading at least one memory map corresponding to the at least one layer of the memory channel interleaving hierarchy for software memory channel interleaving management, wherein the at least one memory map is configured to present a view of memory of the memory subsystem.

8. The method of claim 7, wherein:

the at least one layer of the memory channel interleaving hierarchy for software memory channel interleaving management comprises at least one of an intra-memory channel group layer, an inter-memory channel group layer, or an inter-die memory channel group layer; and the at least one layer of the memory channel interleaving hierarchy for hardware memory channel interleaving management comprises at least one of the intra-memory channel group layer, the inter-memory channel group layer, or the inter-die memory channel group layer that is different from the at least one layer of the memory channel interleaving hierarchy for software memory channel interleaving management.

9. The method of claim 7, further comprising implementing memory channel interleaving according to the at least one layer of the memory channel interleaving hierarchy for software memory channel interleaving management.

10. The method of claim 7, wherein implementing, by the at least one integrated circuit, the memory channel interleaving according to the at least one layer of the memory channel interleaving hierarchy for hardware memory channel interleaving management comprises implementing the memory channel interleaving across a plurality of memory channels of at least one memory channel group of the at least one layer of the memory channel interleaving hierarchy for hardware memory channel interleaving management, the method further comprising implementing the memory channel interleaving across a plurality of memory channels of at least one memory channel group of the at least one layer of the memory channel interleaving hierarchy for software memory channel interleaving management.

11. The method of claim 7, wherein the at least one configuration signal is further configured to indicate to the memory controller the at least one layer of the memory channel interleaving hierarchy for hardware memory channel interleaving management, the method further comprising selecting the at least one integrated circuit configured to implement memory channel interleaving according to the at least one layer of the memory channel interleaving hierarchy for hardware memory channel interleaving management based on the at least one configuration signal.

12. The method of claim 7, wherein the least one signaling mechanism comprises at least one of a register, an electronic fuse, or a pin.

13. A computing device, comprising:

means for reading at least one configuration signal for indicating at least one layer of a memory channel interleaving hierarchy for software memory channel interleaving management;

means for selecting the at least one layer of the memory channel interleaving hierarchy for software memory channel interleaving management based on the at least one configuration signal;

means for implementing memory channel interleaving according to at least one layer of the memory channel interleaving hierarchy for hardware memory channel interleaving management concurrently with means for implementing software memory channel interleaving management; and means for loading at least one memory map corresponding to the at least one layer of the memory channel interleaving hierarchy for software memory channel interleaving management, wherein the at least one memory map is configured to present a view of memory of the memory subsystem.

14. The computing device of claim 13, wherein:

the at least one layer of the memory channel interleaving hierarchy for software memory channel interleaving management comprises at least one of an intra-memory channel group layer, an inter-memory channel group layer, or an inter-die memory channel group layer; and the at least one layer of the memory channel interleaving hierarchy for hardware memory channel interleaving management comprises at least one of the intra-memory channel group layer, the inter-memory channel group layer, or the inter-die memory channel group layer that is different from the at least one layer of the memory channel interleaving hierarchy for software memory channel interleaving management.

15. The computing device of claim 13, wherein means for implementing software memory channel interleaving management comprises means for implementing memory channel interleaving according to the at least one layer of the memory channel interleaving hierarchy for software memory channel interleaving management.

16. The computing device of claim 13, wherein:

means for implementing the memory channel interleaving according to the at least one layer of the memory channel interleaving hierarchy for hardware memory channel interleaving management comprises means for implementing the memory channel interleaving across a plurality of memory channels of at least one memory channel group of the at least one layer of the memory channel interleaving hierarchy for hardware memory channel interleaving management; and wherein means for implementing software memory channel interleaving management comprises means for implementing the memory channel interleaving across a plurality of memory channels of at least one memory channel group of the at least one layer of the memory channel interleaving hierarchy for software memory channel interleaving management.

17. The computing device of claim 13, wherein the at least one configuration signal is further configured to indicate the at least one layer of the memory channel interleaving hierarchy for hardware memory channel interleaving management, the computing device further comprising means for selecting the means for implementing memory channel interleaving according to the at least one layer of the memory channel interleaving hierarchy for hardware memory channel interleaving management based on the at least one configuration signal.

* * * * *